United States Patent [19]
Gabriel

[11] Patent Number: 5,121,800
[45] Date of Patent: Jun. 16, 1992

[54] SOIL LOOSENING DEVICE

[76] Inventor: Herbert Gabriel, Schillerstrasse 22, 6950 Mosbach (Baden-Württemberg), Fed. Rep. of Germany

[21] Appl. No.: 54,023

[22] Filed: May 26, 1987

Related U.S. Application Data

[63] Continuation of Ser. No. 718,422, Apr. 1, 1985, abandoned.

[30] Foreign Application Priority Data

Mar. 31, 1984 [DE] Fed. Rep. of Germany ....... 3412043

[51] Int. Cl.$^5$ ............................................. A01B 33/08
[52] U.S. Cl. ....................................... 172/54; 172/40; 172/699
[58] Field of Search ........................ 172/48, 53, 54, 56, 172/40, 118, 699, 687, 196, 382

[56] References Cited

U.S. PATENT DOCUMENTS 2,952,322  9/1960  Jurcheck .......................... 172/196 X
3,914,948  10/1975  Kaercher ........................... 172/40 X

FOREIGN PATENT DOCUMENTS

| 1138700 | 1/1983 | Canada .................................. 172/196 |
| 1189602 | 3/1965 | Fed. Rep. of Germany ........ 172/40 |
| 2213663 | 9/1973 | Fed. Rep. of Germany ........ 172/40 |
| 3017593 | 11/1981 | Fed. Rep. of Germany ........ 172/48 |
| 4468 | 1/1980 | Japan .................................... 172/40 |
| 906401 | 2/1982 | U.S.S.R. ............................... 172/40 |
| 1292844 | 10/1972 | United Kingdom . |

Primary Examiner—Danton D. DeMille
Attorney, Agent, or Firm—Ronald E. Greigg

[57] ABSTRACT

A soil loosening device connected with a pulling means provides for an intensive deep loosening of compact mainly agriculturally used soils and has for each loosening furrow two oppositely driven teeth in tandem arrangement, equipped with blades which form a joint blade surface subdivided into blade partial surfaces wherein the forward partial blade surface and the rear partial blade surface perform alternately with the forward surface first cutting the soil and the rear surface then lifting the soil which has been cut.

26 Claims, 4 Drawing Sheets

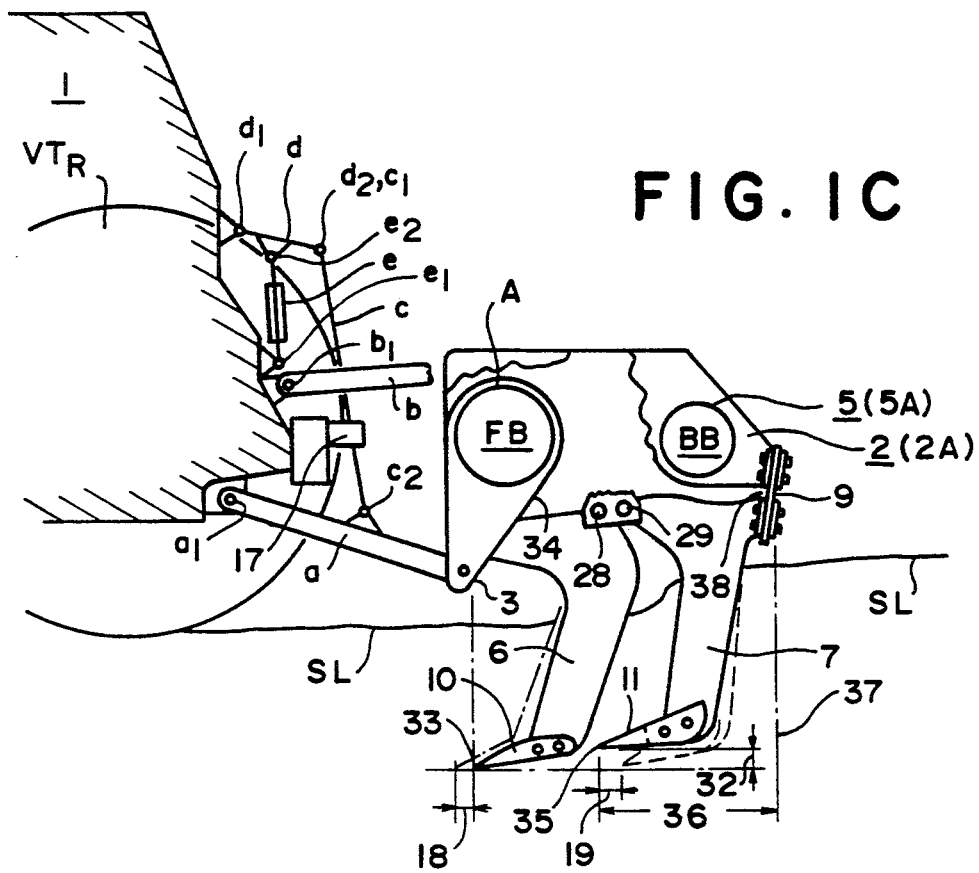
FIG. IC
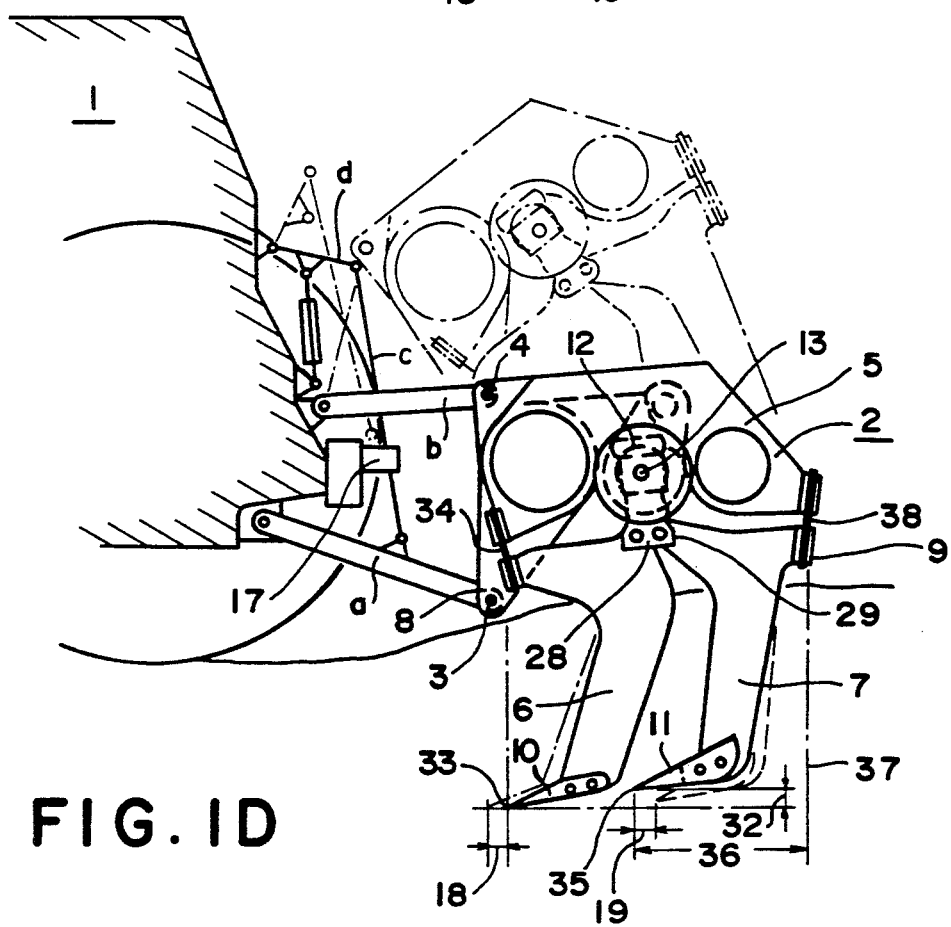
FIG. ID

SOIL LOOSENING DEVICE

CROSS-REFERENCE TO RELATED APPLICATION

The present application is a continuation of my earlier, copending application Ser. No. 718,422, filed Apr. 1, 1985, now abandoned.

BACKGROUND OF THE INVENTION

The present invention concerns deep-acting, soil-loosening gang plows used to loosen and break up compacted soils, usually for agricultural purposes, such plows being provided with a frame adjustably mounted on a towing vehicle, and furthermore being provided with power-driven shares that perform the functions of cutting free the bottom of a furrow slice interval and then lifting the material thereof in order to break up and loosen the same, the shares being mounted on downwardly extending teeth which are adjustable with respect to their depth of penetration into the subsoil.

In agriculture it has for years been known to use soil loosening plows to improve soil quality and increase harvestable yield. Initially these devices were provided with immovable, downwardly extending teeth having blades or shares thereon. Nowadays, these soil-loosening plows are frequently provided with blades that perform movements during plowing, in order to improve the quality of the loosening action, on the one hand, and, on the other hand, to reduce the required towing power or, equivalently, to increase the acreage worked per unit time in the event that the towing power is a given. In agriculture, these soil-loosening gang plows are attached to the rear of a towing vehicle because, if located there, they are very easily maneuvered. Now that it is known that blades or shares which perform movements during plowing can decrease the required towing force, various new systems have been developed to cause the blades or shares to perform such movements.

DE-OS 1,918,670 discloses a system in which the blade rocks about a pivot pin that extends transverse to the blade advancement direction. DE-PS 2,607,364.3 discloses another system, in which the blade is moved by two levers of a linkage arrangement, in such a manner as to perform a compound motion constituted by two individual motions: the first, a forward penetration serving to cut free the bottom of a furrow slice increment; followed by the second, a lifting action which breaks up and loosens the material of the furrow slice. DE-OS 3,128,736.0 discloses a further system, in which a rocking motion is positively imparted to the blade as a result of the conjoined motions performed by the tooth that carries this blade and performed by an auxiliary cutter pivotally connected to the blade.

Each of the last two mentioned systems has one single movable blade per furrow to be formed, such single blade constituting the whole of the share and being positively driven throughout its entire cycle of motion in such a manner that, during the course of one rotation of a crank, material is displaced first by the leading half of the blade and then by the trailing half of the blade.

The leading half of the blade, at its leading end, cuts free the bottom of a furrow slice interval during a forwardly directed cutting motion. The trailing blade half lifts the material of the furrow slice during a subsequent lifting step. For this purpose, the levers which carry and impart motion to the blades are provided with corresponding, special linkages linking them together. These linkages require a certain amount of space underneath the blade halves, this being due to: the need to brace the blade against the soil resistance presented to it; the need to provide encapsulated bearings able to withstand chemically aggressive soils; and being also due to the geometry selected for the polygonal linkage itself. For this reason, in such constructions so large a blade surface is required that, when the blade is designed with a suitable shape, the result is a very large-bladed and very power-consuming soil-loosening plow that can be towed only by a correspondingly powerful towing vehicle. For practical purposes, and taking into account the towing forces provided by the towing vehicles generally available in agriculture a significant compromise had to be made hitherto, with regard to the design of the blade or share. Mounting and bearing considerations dictated blade designs such that the power required for cutting free the bottom of the furrow slice differed very markedly from the power required for lifting up the material of the furrow slice. Since the towing-force required of the towing vehicle depends upon the peak towing force required, which here is that required during the initial step of cutting free the bottom of the furrow slice, wheeled farm vehicles of the type having vehicle tires would repeatedly lose traction. Thus, hitherto, these plows, if designed with share or blade motions of an actually worthwhile character, would for most practical purposes be used only with caterpillar-type towing vehicles. The latter, however, are only seldom available in agriculture, for which reason deep-acting soil-loosening gang plows with optimum blade motion could not find wide application.

DE-OS 3,006,446 discloses a tractor-mounted device for loosening soil having two soil-loosening tools movable up and down on a carrier frame, being arranged one behind the other as a pair, the front such loosening tool being located higher than the rear such tool, considered in the direction of tractor travel, and the shafts for the two tools of each such pair of tools moving up and down in phase-opposition to each other. The leading end of the rear tool and the trailing end of the front lie advantageously on a straight line extending approximately in the direction of the up and down motion of the tools. The shafts for the tools can be arranged inclined upwardly and forwardly, with their motions being performed in the direction of their elongation. In particular, the front soil-loosening tool must have a wider blade than the more deeply positioned rear tool. The shafts for these tools are mounted to be longitudinally displaceable. Each tool of the pair can be pivotally mounted on a respective two-armed lever and be moved by means of an eccentric drive having a vibrating output shaft that extends transverse to the direction of travel. With this device the upper soil layer is first to be broken up by the front tool and then be more finely broken up as the underlying soil layer is lifted by the more deeply positioned rear tool, so that with two blades or shares working one behind the other at different depths there remain no compacted intermediate layer. With the two blades or shares being located at different depths and moving up and down in phase-opposition to each other, a shearing action is intended to develop in the soil between them, such that, in the space between them, the crumbled portions of the material of the deeper layer be rubbed against one another. Even in the earlier-mentioned case where the shafts for the two tools of a pair are inclined, so that the paths of motion of the two shares are likewise inclined, the motions performed by the two shares do not include any significant horizontal component, since only motion predominantly in the vertical direction is contemplated. Accordingly, as to any forward motion performed by the shares in such system (and ignoring whatever forward motion results from the mere fact of forward tractor travel), there is no essential difference compared to systems having entirely stationary shares, in so far as one is concerned with share behavior during the initial step of cutting free the bottom of a furrow slice, which in this prior-art system means the upper layer of the furrow slice. Additionally, this known construction exhibits certain disadvantages. Theoretically, this construction is meant to operate with improved quietness. However, in this respect it fails adequately to take into account the fact that the two shares, when positively forced down by the eccentric drive mechanism, strike with their substantially flat bottom faces against compacted and growth-covered soil, this leading to considerable unevenness of operation. Also, due to the significantly different lengths of the shafts for the two tools, it is in such a construction difficult to provide simple, inexpensive and yet effective mass equalization such as could present to the prime mover, during the course of one cycle of operation of the eccentric drive mechanism, an approximately uniform load for the prime mover to drive Furthermore, both of the two shares must operate in not yet loosened soil. The two shares do not together form a compound or composite plowshare structure whose two parts perform markedly different functions, but instead the two shares perform essentially the same functions and merely operate at different depths. The shafts for the two tools, located one behind the other, do both extend through the upper layer, but do not both extend into the region of the lower layer, which would be essential for the type of deep subsoil loosening action here in question. The shafts and their shares operate, essentially, like a deep-acting soil-loosening plow of the type having stationary shares and share-carrying teeth, to which however a certain amount of up and down motion is imparted, but without any operational or functional subdivision into a first step in which the bottom of a furrow slice interval is cut free, alternating with a subsequent second step in which the material of the furrow slice is lifted. Accordingly, it is not possible to achieve the advantages of the earlier-mentioned DE-PS 2,607,364 and DE-OS 3,128,736, such as those regarding a decreased power requirement even when working in difficult soils.

British patent 1,292,844 discloses an earth-working machine which forms a subsurface channel and simultaneously lays a cable into such channel. A special feature of this machine is to operate in such a manner that soil adjacent the cable channel be disturbed as little as possible. This machine has the form of a two-wheeled attachment mountable to the rear of a towing vehicle and provided with two downwardly extending rippers having wider rear faces and knife-like forward edges, so as to appear wedge-like in horizontal cross section, the two rippers being located one behind the other, considered in the direction of tow, and extending downward into the soil to different respective depths. At their lower ends these rippers have forwardly extending foot-shaped portions that are pointed at their forward ends. The front ripper is shorter than the rear ripper. A dispensing chute for the cable is located rearward of the ripper. Both rippers extend substantially vertically and are mounted on the vehicle frame swingably about horizontal axes. They are formed as two-armed levers whose upper ends are connected via linkages to an eccentric drive in such a manner that the two rippers swing forward and backward in phase opposition to each other, so that the knife-like, vertically extending forward edges of their lower arms both perform generally horizontal motions, in phase opposition to each other, and thus form by cutting the channel into which the cable is to be laid. In addition, eccentric vibrators can impart to the whole frame structure a vibratory motion intended to improve the effectiveness of channel cutting and reduces power consumption. Shares for breaking up and loosening deep subsoil are not provided. The two rippers operate to different depths, so that each need penetrate forwardly only through a subsoil layer corresponding to its own depth of action, and accordingly the rear ripper, operating as it does at a lesser depth, travels through the channel already cut by the front ripper. In this prior-art machine, it is certainly true, in some sense, that two downwardly extending earth-cutting tools are provided and, generally speaking, for earth-working purposes. The arrangement and manner of support of the earth-cutting tools, and the construction of the machine in general, are not such, and not conceived to be such, as to be suitable for loosening compacted, deep-lying subsoil in furrows of the breadths normally required in agriculture.

DE-PS 868,678 discloses a method and an arrangement for reducing the towing force required of a cultivating machine, the machine having a cultivating tool which performs swinging motions. For example a plowshare is suspended by means of a holder from a plurality of springs so as to have two degrees of freedom of swinging motion and is set into and kept in motion by bodies that are rotatably secured to and eccentrically mounted on the holder, in order to reduce friction and comminute larger clumps of soil. The plowshare can be supported directly via flat springs, with the swinging eccentric drive being provided at the free, plowshare-carrying end of the spring. The plowshare cannot execute predetermined, systematic motions controlled with the exactness of a lever arrangement.

U.S. Pat. No. 3,451,487 discloses the use of centrifugal weights for generating vibratory motions in cultivating machines of the type which in their entirety are set into vibratory motion.

The two last-mentioned machines (W. German Patent 868,678 and U.S. Pat. No. 3,451,487) are not provided with plowshare holders exhibiting linkage-action-type motion generation for the plowshares, i.e., such as is provided in the machines discussed further above, and for this reason their plowshares are incapable of following or describing completely predetermined paths of motion. On the other hand, the earlier-discussed machines that do provide for well-defined paths of plowshare or blade motion, if operated to work in deep subsoil, as a rule require very great towing forces that can be provided only by caterpillar-type towing vehicles.

There exists therefore a need for an effective deep-acting, soil-loosening plow which can be practicably towed by a conventional wheeled field tractor.

SUMMARY OF THE INVENTION

Accordingly, it is a general object of the invention to provide a deep-acting, soil-loosening gang plow which avoids the disadvantages of the prior art and which exhibits capabilities not exhibited by prior-art plows.

According to the present invention, each of the plural plow units of the gang plow is provided not with a single plowshare element having, in traditional fashion, both the function of performing a forwardly directed slicing loose of the bottom of a furrow slice and also the function of then lifting the material of the furrow slice.

Instead, the traditional single plowshare element is subdivided into two structurally distinct plowshare subelements: a leading plowshare subelement which mainly performs the forwardly directed slicing loose of the bottom of the furrow slice; and, arranged in tandem fashion directly behind the leading plowshare subelement, a trailing plowshare subelement, which mainly performs the function of lifting the material of the furrow slice. Thus, for each furrow there is provided a soil loosening device in which a cooperating joint blade surface is subdivided into separately suppported and separately movable blade partial surfaces. In that way, two blades cooperate to form a cooperating joint blade surface.

The structurally distinct leading and trailing plowshare subelements follow different respective paths of motion, each in accordance with the function it is to perform. In this way, the leading and trailing plowshare subelements cooperate to act in effect as a single plowshare element. However, by adopting various measures set forth herein, the efficiency with which each of the two aforesaid functions is performed can be increased far beyond what can be achieved using a single plowshare element of even very ingenious configuration, indeed even where such single plowshare element is caused to vibrate in a mathematically indeterminate manner and/or is caused to execute mathematically predetermined motions additional to the simple forward motion that results from the mere fact of the plow being towed.

According to the present invention, the respective paths of motion of the leading and trailing plowshare subelements are so designed that the leading and trailing plowshare subelements respectively effect said slicing and said lifting in alternation with each other.

One result of this is that the available drive power can be mainly routed to the leading plowshare subelement during the slicing action and then be mainly routed to the trailing plowshare subelement during the lifting action, so that each of these two functions is performed with increased power. Alternatively, in situations where the main consideration is not increased powerfulness of the slicing and lifting motions but, instead, being able to use a less powerful towing vehicle, the advantage in question can be expressed in such terms.

The subdivision into two plowshare subelements, one for slicing and the other for lifting in the manner set forth above, also tends to increase the uniformity with respect to time of the total reaction force exerted by the oncoming soil against the towed plow unit.

Indeed, this tendency can be positively exploited, in a manner tending to maximize such uniformity. Because the two plowshare subelements are structurally distinct and follow different respective paths of motion, their configurations and their respective paths of motion can be so designed, that the tow-resisting force that the oncoming soil exerts upon the leading plowshare subelement during slicing loose the bottom of the furrow slice, and the tow-resisting force that the oncoming soil exerts upon the trailing plowshare subelement during the lifting of the material of the furrow slice, can be made at least approximately equal to each other.

Thus, compared to the earlier-discussed prior art wherein a single plowshare or plowblade element performs rocking motions, with its forward and back halves respectively responsible for slicing and lifting, the plow unit of the present invention provides the designer with an increased number of degrees of freedom in designing the configurations and especially the paths of motion for the two plowshare subelements.

The invention furthermore contemplates very substantial minimization of the tow-resisting force exerted on the leading plowshare subelement during the lifting action performed by the trailing plowshare subelement and, conversely, very substantial minimization of the tow-resisting force exerted on the trailing plowshare subelement during the slicing action performed by the leading plowshare subelement.

In the presently preferred embodiment of the invention, this is achieved as follows. The path of motion for the leading plowshare subelement is mainly directed horizontally or in the tow direction and exhibits a comparatively small vertical component of motion. In contrast, the path of motion of the trailing plowshare subelement exhibits a comparatively large vertical component of motion, and furthermore exhibits a horizontal component of motion approximately on the order of magnitude of the horizontal motion component of the leading plowshare subelement. The leading and trailing plowshare subelements thus perform recurring motions having respective horizontal amplitudes corresponding to such horizontal components. During first time intervals, the horizontal motion component of the leading plowshare subelement is forwardly directed whereas that of the trailing plowshare subelement is rearwardly directed. During second time intervals that alternate with the first time intervals, the horizontal motion component of the leading plowshare subelement is rearwardly directed whereas that of the trailing plowshare subelement is forwardly directed.

As a result, during the first time intervals the tow-resisting load exerted by the oncoming soil against the trailing plowshare subelement is comparatively low, because the trailing plowshare subelement is fleeing rearwardly away from the oncoming soil. In contrast, the tow-resisting load exerted against the leading plowshare subelement is comparatively great, because the latter is moving forwardly relative to the gang plow frame into the oncoming soil, i.e., with a forward horizontal speed greater than the mere speed of tow. During the second time intervals the situation is reversed. The tow-resisting load exerted by the oncoming soil against the leading plowshare subelement is comparatively low, because now the leading plowshare subelement is fleeing rearwardly away from the oncoming soil. In contrast, the tow-resisting load exerted against the trailing plowshare subelement is comparatively great, because now it is the latter that is moving forwardly relative to the gang plow frame into the oncoming soil, i.e., with a forward horizontal speed greater than the mere speed of tow. Such relationships contribute markedly to the uniformity with respect to time of the tow-resisting load exerted by the oncoming soil upon the gang plow as a whole.

In principle, and in practice, this effect can be exploited to an extreme. The paths of motion of the two plowshare subelements can be so designed that, during said first and second time intervals, the two plowshare subelements exhibit horizontal speed components that are equal to each other (although oppositely directed) and, furthermore, equal to the speed of tow (presuming the speed of tow to be more or less a given).

As a result, during the first time intervals the trailing plowshare subelement exhibits zero horizontal speed relative to the soil, so as to be virtually at a standstill relative to the soil, despite the fact that towing of the plow is proceeding. In contrast, during the second time intervals the leading plowshare subelement exhibits zero horizontal speed relative to the soil, so that now it is at a virtual standstill relative to the soil, despite the fact that towing of the plow is proceeding. Such relationships contribute very greatly to the uniformity with respect to time of the tow-resisting load exerted by the oncoming soil upon the gang plow as a whole. Of course, it is not necessary to push the matter to such an ideal extreme. A very significant improvement results even if, during the first time intervals, the (rearward) horizontal speed component of the trailing plowshare subelement is not incessantly equal to the speed of tow and, similarly, if, during the second time intervals, the (rearward) horizontal speed component of the leading plowshare subelement is not incessantly equal to the speed of tow.

Here again, and to a more extreme degree, the drive power (or at least the component thereof acting to effect horizontally directed motion of the two plowshare subelements) is caused to be routed, alternately, almost entirely to one and then the other of the two plowshare subelements, so that the slicing action and the lifting action can each be performed very powerfully, for a given available drive power. Alternatively, as already suggested, it may be that the main consideration is not the powerfulness of the slicing and lifting actions but, instead, the ability to use a not very powerful towing vehicle. If that be the case, the ability of the towing vehicle to pull against a given tow-resisting load exerted by the soil upon the plow, i.e., without repeatedly losing traction, can be lower than otherwise.

The great practical advantage of this is that the decrease in the towing force required of the towing vehicle is such as to make it for the first time genuinely practical to use as the towing vehicle an ordinary wheeled farm tractor of the type having tires on its wheels, i.e., an ordinary farm tractor of the type that is in general already owned by a farmer, in lieu of a more powerful caterpillar-type towing vehicle of the type which a farmer is not very likely to own.

In addition, the increased uniformity with respect to time of the tow-resisting load exerted upon the plow unit by the oncoming soil also brings with it the benefit of quieter operation.

The interrelated paths of motions followed by the leading and trailing plowshare subelements can be implemented by a great variety of designs for the motion-generating mechanism, e.g., using various different locations for the pivot points, various different lengths for the lever arms constituted by various structural elements, and so forth. Of course, one must still design the motion-generating mechanism such that it continue to cause the leading and trailing plowshare subelements to follow interrelated paths of motions like those described above.

A particularly preferred embodiment is disclosed herein, having the advantages of being especially simple, of requiring only a few pivot points, and of supporting and supplying requisite bracing forces down to the plowshare subelements in a very solid manner which, furthermore, minimizes any contact between pivot locations, and the like, with the soil being worked. In this preferred embodiment the leading end of the leading plowshare subelement is located, at least roughly, vertically below the pivot location of a pivotally mounted front tooth at whose bottom end the leading plowshare subelement is secured. In that event, the front tooth and forward plowshare subelement together perform a simple reciprocatory swinging motion along the arc of a circle. Furthermore, the amplitude of this motion can be between approximately 30 mm and 50 mm, for example. Such an amplitude, considered relative to the much longer radius of the circular-arc reciprocation, means that the reciprocatory motion of the forward plowshare subelement is almost exclusively horizontal. It will be understood that this is a great improvement, for example compared to the generation of such linear horizontal motion by means such as linearly shiftable articulate connections or specially configured quadrilateral linkage lever systems. Locating the leading end of the forward plowshare element substantially directly below the pivot location of the associated, pivotally mounted plowshare-subelement-carrying tooth has a further advantage, in that the just mentioned almost exclusively horizontal reciprocation of the forward plowshare element avoids soil-compaction and soil-stomping effects because the forward plowshare element is effectively moving only tangentially relative to the subsoil that it engages. As a result, the plowing action is performed more quietly than otherwise, tow-resisting and braking forces that could result from such disadvantageous soil-compacting action are avoided, and the total power requirement for towing the plow can be considerably reduced.

If it is desired to mount the rear plowshare subelement on a rear tooth, with the latter pivoting about only one pivot point, this can be readily achieved by locating the leading end of the rear plowshare subelement horizontally spaced a certain distance from an imaginary vertical line that passes through such one pivot point. The person of ordinary skill in the art, on the basis of the relationships already stated concerning paths of motion, etc., and employing computational and/or empirical design techniques, will appropriately choose the ratios of the distance just mentioned and the lever-arm lengths implied by the structural elements in a manner which takes into account the interrelationships among the stroke length that he desires for the rear plowshare subelement, the desired or expected travel velocity of the towing vehicle, and the towing power which the towing vehicle can, or is to called upon, to provide. In this regard, it is advantageous that the main pivot point of the front and of the rear plowshare-subelement-carrying teeth be horizontally spaced a fair distance from each other. This causes the plow as a whole to be very stably supported by the earth upon which it is working. Furthermore, a sizable enough horizontal distance between such two main pivot points leaves room enough to locate between them an appropriate mechanism for imparting pivoting motion to both such teeth, such mechanism being for example provided midway between the two mentioned pivot points.

Assuming the load-bearing time intervals of the leading and trailing plowshare subelements are made to alternate or be phase opposed in the way described above, then the use of forward and rear teeth of roughly equal length carrying leading and trailing plowshare elements of roughly similar size may in itself be enough to achieve a considerable degree of uniformity in the tow-resisting load against which the towing tractor must pull. However, the present invention in effect divides a single plowshare element into leading and trailing plowshare subelements and then causes these to perform interrelated, functionally meaningful motions that no single plowshare element would be capable of performing. Accordingly, further degrees of freedom are available to make the tow-resisting load very uniform, these including the choice of the surface area of the leading and trailing plowshare subelements, the dimensioning of especially their leading edges, as well as their respective angles of incidence relative to oncoming soil during towing. Values for these can be chosen such that the tow-resisting component of load or power attributable to the forward plowshare element during soil working and the tow-resisting component of load or power attributable to the rear plowshare element are made to become approximately equal to each other. In general, compared to conventional constructions, the number of significant degrees of design freedom is increased. This permits not only a minimization of operating noise but also a more efficient utilization of the towing power available from, for example, a not very powerful towing vehicle. Certainly, the earlier mentioned use of equally long front and rear plowshare-subelement-carrying teeth and the greater number of available degrees of design freedom, taken in conjunction, will often suffice to produce a tow-resisting load of satisfactory uniformity. If the two pivotally mounted, reciprocating, plowshare-subelement teeth receive reciprocatory pivoting motion from one and the same motion-generating mechanism, then inequality as between the loads or powers demanded by the leading and trailing plowshare subelements can be somewhat problematic for such shared, single motion-imparting mechanism to withstand. In such event, the drive shaft of the motion-imparting mechanism can be provided with flywheels to further increase the uniformity of the load "seen" by such shared motion-imparting mechanism. Of course, the use of flywheels to increase the uniformity of loading is nothing new in itself. Here, however, this well known load-evening expedient can be utilized, without such expedient being the chief contributor to the uniformity of the tow-resisting load.

Advantageously, the plowshare-subelement-carrying teeth are configured as angle levers engaged by a drive rod in turn driven by an eccentric. In this way the number of articulately connected elements is reduced to a minimum, with corresponding benefits regarding manufacture, maintenance and service life. Furthermore the important, interrelated paths of motion discussed further above for the leading and trailing plowshare subelements can be implemented using a simple, rugged motion-generating system performing motions which are themselves simple, the drive energy received by such motion-generating system being with high efficiency transmitted on to the plowshare-subelement-carrying teeth.

One possibility is to provide the plow frame with simple pivot mounts formed with pivot bolts defining pivot axes, and to use such simple pivot mounts to articulately couple the plowshare-subelement-carrying teeth to the plow frame. In that event, when one designs the motion-generating system that imparts reciprocatory motion to such teeth, the chief concern will be the exact relative motions produced by the motion-generating system and imparted to such teeth in the particular vicinity where such system engages such teeth, especially for example if the motion-generating system is located, in the manner mentioned further above, roughly midway between the two main pivot points of these plowshare-subelement-carrying teeth. However in a below described, particularly preferred embodiment of the invention, means quite different from such pivot-bolt mounts are employed for the articulate connection of such teeth to the plow frame, achieving important advantages regarding manufacture, use and servicing. The articulate connections of the mentioned teeth to the plow frame are implemented using flat or leaf springs. The pivoting motions of the plowshare-subelement-carrying teeth, i.e., at the locations where these are connected to the respective flat springs, are implemented by simple bending motions which these flat springs can and do perform.

The plow can be so designed that each flat spring, in addition to pivotally mounting the associated plowshare-subelement-carrying tooth, also serves to vectorially oppose the sum of forces acting upon the associated plowshare subelement during soil working. During soil working, the oncoming soil exerts upon each plowshare subelement a first force having a first general direction and magnitude; the motion-generating means imparts to each plowshare subelement a second force having a second general direction and magnitude; and the vectorial sum of these first and second forces as applied the leading or to the trailing plowshare subelement will in general not be zero. Accordingly, if a third force opposing and generally cancelling such vectorial sum is to be supplied, it must be supplied by the associated flat spring itself. In the preferred embodiment described hereinbelow, the longitudinal direction of each flat spring coincides with the general direction of the respective third force. This is very advantageous. A flat spring performing bending motions is most susceptible to excessive loading when presented with forces that excessively bend the flat spring. Thus, orienting each flat spring in such a manner that its longitudinal direction coincides with the respective, just mentioned vector sum enables each flat spring to oppose and at least partly cancel the mentioned vector sum without experiencing any substantial bending load.

As already said, the front and rear plowshare-subelement-carrying teeth can each be configured as an angle lever and, furthermore, with one lever arm of each being longer and the other lever arm of each being shorter, each longer lever arm extending downwards from the associated flat spring and carrying at its bottom end the respective plowshare subelement, each shorter lever arm extending generally horizontally away from the associated flat spring. In that event, the amplitude of the reciprocatory motion performed by the comparatively longer lever arm of each plowshare-subelement-carrying tooth is small enough that the corresponding bending motions which the associated flat spring must perform are relatively small, easily performed, and do not at all unduly stress the flat spring.

In consequence of the aspects just discussed, the pivoting motions that bend the flat springs have little or no tendency to cause the flat springs to wear out. This is in favorable contrast to the way in which relatively high-frequency, incessant pivoting motions can cause considerable wear and tear upon simple pivot-bolt pivot mounts, especially considering the magnitudes of the forces that would be applied to such simple pivot mounts during heavy plowing work. Furthermore, the pivoting motions implemented by the bending of such flat springs can for all practical purposes be no less kinematically definite than pivoting motions defined by pivot mounts of the pivot-bolt type.

As already stated, it is preferred that a minimum number of articulately or pivotally mounted structural elements be employed to implement the inventively interrelated paths of motion for the leading and trailing plowshare subelements. In such event, the forces to which the individual structural elements are subjected may stress them in such directions that they cannot relieve themselves from, or react to, such forces by mere performance of pure and simple pivotal motions. In this regard, the use of the mentioned flat springs to pivotally mount the plowshare-subelement-carrying teeth on the plow frame can be of great advantage, in that these flat springs can without risk of overloading take up such problematic vectorial components of the forces to which the other individual structural elements may be subjected during soil working. Not least of all, such flat springs are easily mounted and inexpensive to manufacture.

(Incidentally, it should be emphasized that the above explained use of such flat springs is not at all comparable to prior-art use of springy suspensions for simple plowshare elements, etc. The herein discussed flat springs importantly participate in the establishment of well-defined, interrelated paths of motion for the leading and trailing plowshare subelements. In contrast, the mentioned springy suspensions of the prior art merely serve to permit kinematically indeterminate springiness or vibration of a suspended plowshare element, without in any way constraining such springily suspended plowshare element to incessantly follow a predetermined and kinematically definite path of motion.)

In any event, returning to the ability of the flat springs to take up the mentioned problematic vectorial components of forces exerted upon other structural elements of the plow, a further concept of the invention should be mentioned, utilized in the below described preferred embodiment. The already described shorter lever arm of the front plowshare-subelement-carrying tooth can extend rearwards, and that of the rear tooth can extend forwards, to come together at a region horizontally intermediate the front and rear flat springs and then, at such region, both be pivotally joined to a single drive rod that reciprocates in a generally vertical direction. As already noted, the pivot points established by the front and rear flat springs differ from those that would be provided by simple pivot-bolt pivot mounts. If the latter were used, the just mentioned pivotal connection to a single, vertically reciprocating drive rod would result in a lever system that would be "overdetermined". However, the preferred use of flat springs to establish the pivotal connections to the plow frame very simply avoids an "overdetermined" design condition. As the single, vertically reciprocating drive rod rises or falls to pivot both plowshare-subelement-carrying teeth simultaneously with each other, the inability of the mentioned shorter, roughly horizontally extending lever arms of these teeth to undergo a change of length is very simply compensated by roughly horizontal displacement of the front and rear flat springs away from each other. Furthermore, if one employs the geometry of the below described most preferred embodiment, the amplitude of the roughly vertical reciprocations performed by the mentioned single drive rod can be as small as 10 mm, for example. In that event, during their mentioned roughly horizontal displacements towards and away from each other, the stresses to which the front and rear flat springs are repeatedly subjected can be absorbed by them without any risk of overloading and without any particular wear and tear upon them.

As stated further above, it is advantageous that the horizontal distance between the front and rear flat springs be sizable for solid and stable support of the plow upon the soil that is being worked. As likewise stated further above, it is advantageous that the front and rear flat springs each be so oriented that its longitudinal direction at least roughly coincides with the direction of the otherwise uncompensated vector sum of the forces exerted upon the respective one of the leading and the trailing plowshare subelements. In the below described most preferred embodiment, both these advantageous concepts are employed, and the front flat springs longitudinally extends downwards and rearwards, whereas the rear flat spring longitudinally extends downwards and forwards. The below presented detailed description of such preferred embodiment will make clear that such spatial orientations for the flat springs make for an extremely simple construction. Furthermore, and not unimportantly, such construction has a visual appearance that conveys insight into the play of forces occurring among the various structural elements of the plow. This can be very helpful to designers of such plows when they wish or need to dimensionally modify the herein shown exemplary construction, because the computational and empirical design efforts of such designers can be intelligently guided by their knowledge of physics and by their educated personal intuitions.

The inventive plow is advantageously attached directly to the towing vehicle, with provision of suitable means for lifting the plow relative to the vehicle when the vehicle and plow are to travel from one work site to another, and for lowering the plow relative to the vehicle when the plow is to commence soil-working activity. Advantageously, the plow frame is provided with standardized coupling structure having coupling members at standardized locations, so that it may readily be affixed to the already present mounting members that this or that particular class of agricultural towing vehicles are already equipped with for the towing of various different agricultural machines. It has already been explained that the inventive plow has very special meaning for agricultural tractors of the type having wheels provided with tires, inasmuch as such tractors are generally less able to pull powerfully acting plows than are caterpillar-type agricultural towing vehicles; from that particular viewpoint, it is especially meaningful that the coupling members on the plow frame have standardized shapes and locations corresponding to those on such wheeled farm tractors. Importantly, the means for lifting and lowering the plow relative to the towing vehicle should include means for selecting the degree to which the plow is lowered. Firstly, this allows the plow to work the subsoil at different depths. Secondly, this allows adjustment of the working depth relative to the capabilities (or employed capabilities) of the towing vehicle in a manner which can optimize operating conditions. For example, the driver of a farm tractor of the type having wheels equipped with tires can continually make fine adjustments of the working depth of the inventive plow, to take into account varying operating conditions. Thus, for example, if the operator is driving the tractor up an incline during soil working, thereby increasing the power requirements placed upon the tractor, the driver may choose to somewhat decrease the working depth of the plow in order to avoid stalling of the tractor and/or to maintain a desired forward speed at which the tractor's engine is best or optimally able to generate torque, etc. In contrast, if the inventive plow were to be provided with support wheels of its own, this could in various circumstances decrease or interfere with the operator's ability to optimize the conditions of operation. In this regard, one can appreciate the marked difference compared to the wheel-supported ditching-digging instrumentalities of prior-art cable-laying equipment, for example.

Advantageously, the leading and trailing plowshare subelements are designed to have substantially the same angle of incidence relative to oncoming subsoil. In that event, it is furthermore advantageous that the leading end of the trailing plowshare subelement be located at about the vertical height of the trailing end of the leading plowshare subelement, i.e., considered at the time when the trailing plowshare element is at the end of its generally downward, soil-dropping stroke and is commencing its generally upward, soil-lifting stroke. In this way, the furrow slice that slides off the trailing end of the leading subelement is rather directly received by the leading end of the trailing plowshare subelement. Also, as a result, the leading end of the trailing plowshare subelement is thus clearly higher than the leading of the leading plowshare subelement. In consequence of this, tilted orientations of the towing vehicle do not lead to soil being compacted beneath the trailing plowshare subelement.

The novel features which are considered as characteristic for the invention are set forth in particular in the appended claims. The invention itself, however, both as to its 15 construction and its method of operation, together with additional objects and advantages thereof, will be best understood from the following description of specific embodiments when read in connection with the accompanying drawing.

BRIEF DESCRIPTION OF THE DRAWING

FIG. 1C is the same as the FIG. 1 view but with various structural elements, or parts of them, removed to expose to view the entirety of a mounting fixture A.

FIG. 1D is the same as the FIG. 1 view but showing in phantom the gang plow in its raised position for transport.

DESCRIPTION OF THE PREFERRED EMBODIMENTS

Figure 1:
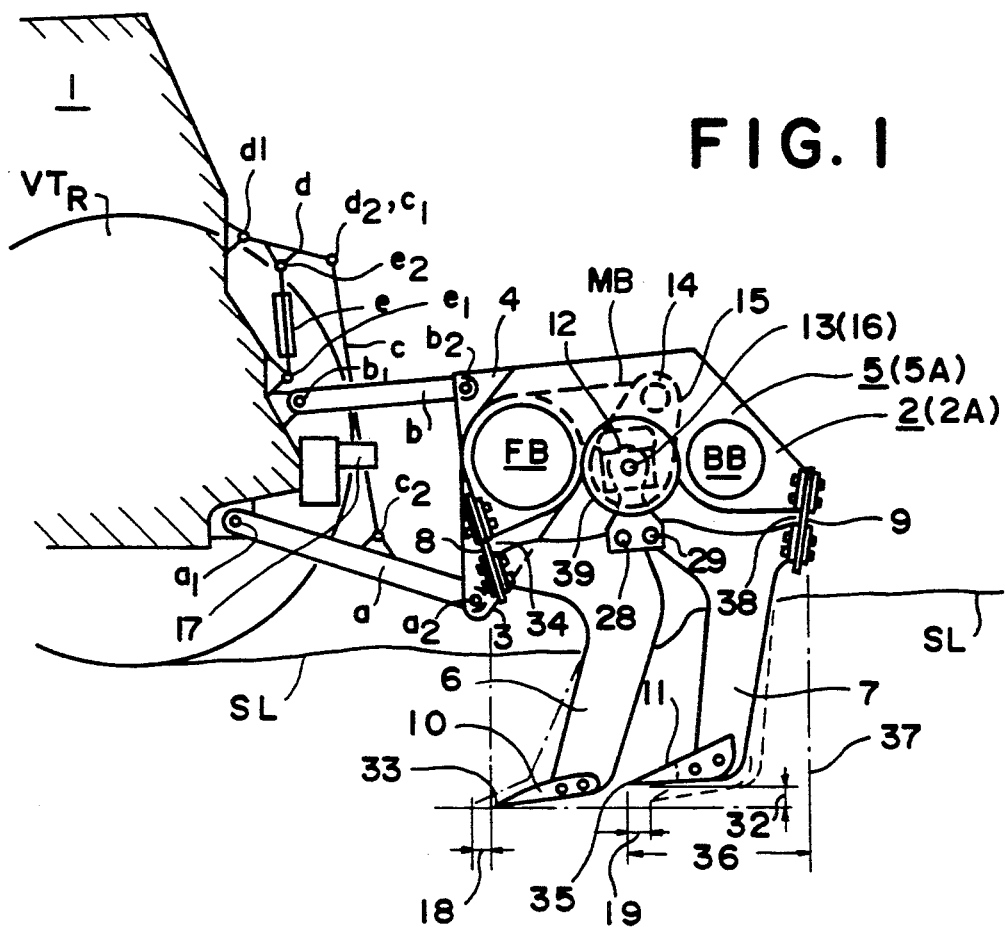
FIG. 1 is a schematic side view of a gang plow embodying various concepts of the present invention, with the left rear vehicle tire $VT_L$ of FIG. 2 removed to better expose certain elements to view.
Figure 2:
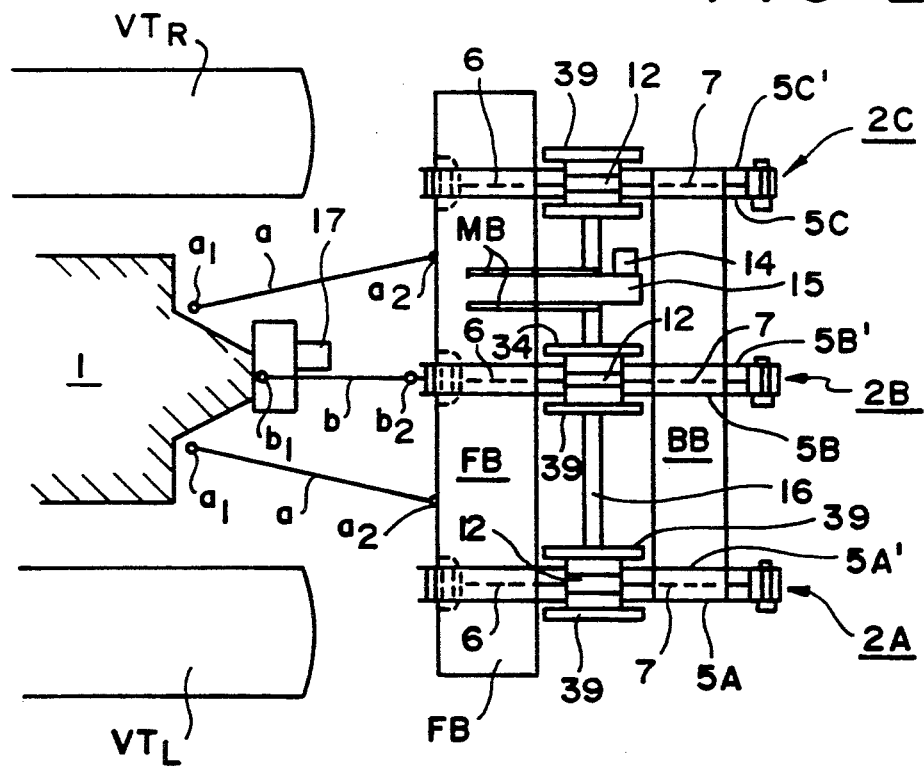
FIG. 2 is a schematic top view of the gang plow of FIG. 1.

FIGS. 1-2 illustrate a first embodiment of the invention and schematically depict a wheeled farm tractor 1 having rear left and right vehicle tires $VT_L$ and $VT_R$ towing a deep-acting, soil-loosening plow generally denoted 2. As best seen in the FIG. 2 top view, plow 2 is a gang plow, here having three plow units generally denoted 2A, 2B and 2C. Plow units 2A, 2B, 2C, as can be seen in FIG. 2, are spaced along a front transverse beam FB and a back transverse beam BB, these being cylindrical (see FIG. 1). When towed, the plow 2 forms three furrows, one per plow unit.

The plow 2 has a gang plow frame generally denoted by 5 in FIG. 1. As best seen in FIG. 2, each plow unit 2A, 2B, 2C is provided with its own respective frame unit 5A, 5A'; 5B, 5B'; 5C, 5C'.

Figure 1A:
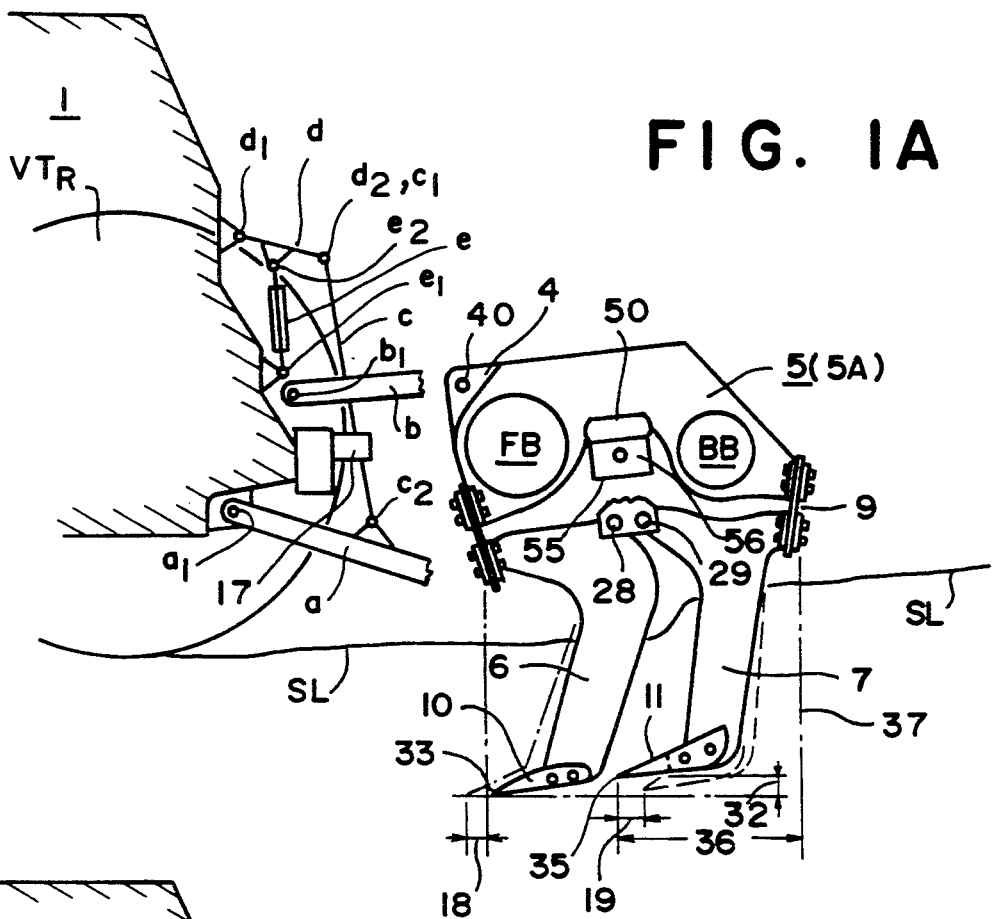
FIG. 1A is the same as the FIG. 1 view but with various structural elements, or parts of them, removed to expose to view the entirety of plowframe element 5A.

FIG. 1 is a side view of the FIG. 2 plow, but with the rear left vehicle tire $VT_L$ removed to improve clarity. Accordingly, the one plow unit directly visible in FIG. 1 is the left plow unit 2A, as indicated in FIG. 1 by the parenthetical designation (2A). Similarly, although left plow unit 2A is provided with a pair of frame elements 5A, 5A', in FIG. 1 only the frame element 5A thereof is directly visible, as indicated in FIG. 1 by the parenthetical designation (5A). The shape of frame element 5A per se is shown in the FIG. 1A detail view. The three pairs of frame elements 5A, 5A'; 5B, 5B'; 5C, 5C' are secured to front beam FB and back beam BB by any conventional technique, e.g., by welding, or by means of (not illustrated) flanges and bolts, etc.

Gang plow frame 5 is articulately attached to the rear of farm tractor 1 by means of a lever-linkage system of a general type well known and widely used in the art, here very schematically depicted as comprising levers a, b, c, d. As schematically shown in FIG. 1, a lower linkage lever a has a first end articulately connected at $a_1$ to a fixture on the rear of tractor 1. As best seen albeit schematically in FIG. 2, there are two such lower linkage levers a, and each has a first such end articulately connected at a respective location $a_1$ to a respective such mounting fixture on the rear of the tractor.

The very schematically indicated lever-linkage system a, b, c, d here furthermore includes an upper linkage lever b having a first end articulately connected at $b_1$ to a respective mounting fixture on the rear of tractor 1. As best seen albeit schematically in FIG. 2, there is but a single such upper linkage lever b and a single mounting fixture at $b_1$ to which it is articulately connected.

The other end $b_2$ of upper linkage lever b is articulately connected at 4 to a corner portion provided on the frame unit 5B, 5B' of the middle one 2B of the three plow units 2A, 2B, 2C of gang plow 2.

The other ends $a_2$ of the already mentioned two lower linkage levers a are, in the very schematic depiction of FIG. 2, articulately connected to the plow frame 5 at two respective locations 3 (see FIG. 1), one of which is intermediate middle plow unit 2B and left plow unit 2A, the other being located intermediate middle plow unit 2B and right plow unit 2C. In particular, as indicated in FIG. 1, at each of these two locations 3 the plow frame is provided with a respective depending mounting portion A, of a shape that is shown per se in the FIG. 1C detail view. The depending mounting portions A surround the front beam FB and may be secured thereto in any customary manner, e.g. by welding or by means of (not illustrated) flanges and bolts, etc.

The very schematically indicated lever-linkage system a, b, c, d furthermore includes a linkage rod d whose left end (as viewed in FIG. 1) is articulately connected at $d_1$ to a respective mounting fixture on the rear end of tractor 1.

A preferably hydraulic strut e has a lower end articulately connected at $e_1$ to a respective mounting fixture on tractor 1 and an upper end articulately connected to a fixture located at $e_2$, intermediate the two ends of linkage rod d. The one of the two linkage levers a that is visible in FIG. 1 is provided, intermediate its ends, with a mounting fixture at $c_2$, to which the lower end of a linkage rod c is articulately connected. The right end (as viewed in FIG. 1) of linkage rod d is articulately connected at $d_2$, $c_1$ to the upper end of linkage rod c (or—self-evidently—to the upper ends of two such linkage rods c, if each of the lower linkage levers a were to have articulately connected to it the lower end of a respective one of two such linkage rods c).

When the preferably hydraulic lifter strut e is in the state of actuation shown in FIG. 1, the gang plow 2 occupies the shown vertical elevation relative to the rear of tractor 1. When lifter strut e is in a different state of actuation, it is of increased length, changing the shape of the linkage-lever system a, b, c, d, in customary manner, so that the gang plow 2 be in raised condition, as shown in FIG. 1D, e.g., so that the gang plow can be transported from one place to another. Obviously, if the preferably hydraulic lifter strut e is in a state of actuation intermediate those shown in FIGS. 1 and 1D, the gang plow 2 will occupy, relative to the rear of the tractor 1, an elevation intermediate those shown in FIGS. 1 and 1D. In this way, and as is entirely customary, the lever-linkage system and its power lift are also used to determine the depth to which the plowshares of the gang plow will penetrate the subsoil.

The lever-linkage system has been shown in so schematic a manner in the Figures because such lever-linkage systems have, for decades, been very well known and very widely employed for gang plows and other tractor-towed farm equipment, and are thus so extremely familiar to persons of routine skill in the art as to merit depiction and description no more detailed than here given. Furthermore, the details of such customary lever-linkage systems, with their power lifts, having been for decades so well known, that such details scarcely constitute in themselves novel aspects of the present invention. On the other hand, it is positively noted that, at present, it is preferred that the gang plow be attached to the tractor rear using a lever-linkage system of the general type very schematically indicated here, i.e., that the gang plow frame not be provided with plow-weight-supporting wheels of its own.

Each plow unit 2A, 2B, 2C is provided with a depending leading tooth 6 and a depending trailing tooth 7, the teeth 6, 7 being flat elements (see FIG. 2) occupying planes parallel to the picture plane of FIG. 1. Indeed, as can be clearly seen in FIG. 2, the two depending teeth 6, 7 of each plow unit are arranged in substantially the same plane, in tandem fashion, i.e., one behind the other. As seen best in FIG. 1, these teeth 6, 7 penetrate below the soil level SL into deep-lying subsoil regions.

In FIG. 1, the leading tooth 6 is articulately connected to the leading end of frame unit 5A, 5A' of left plow unit 2A at a location near the leading end of frame unit 5A, 5A'. Leading tooth 6 can tilt relative to frame unit 5A, 5A' with pivoting-like motion, the effective pivot location being indicated at 34. In particular, the articulate connection between leading tooth 6 and frame unit 5A, 5A' is implemented by connecting the former to the latter using a stiff, flat spring or leaf spring 8. The top and bottom ends of flat spring 8 are secured to frame unit 5A, 5A' and to the leading tooth 6, respectively, by means of flange clamps and screws.

In FIG. 1, the situation is generally similar for trailing tooth 7. In particular, trailing tooth 7 is articulately connected to the trailing end of frame unit 5A, 5A' of left plow unit 2A at a location near the trailing end of frame unit 5A, 5A'. Trailing tooth 7 can tilt relative to frame unit 5A, 5A' with pivoting-like motion, the effective pivot location being indicated at 38. The articulate connection between trailing tooth 7 and frame unit 5A, 5A' is implemented by connecting the former to the latter using a second stiff, flat spring or leaf spring 9. The top and bottom ends of flat spring 9 are secured to frame unit 5A, 5A' and to trailing tooth 7, respectively, by means of flange clamps and screws.

The middle and right plow units 2B and 2C are likewise provided with respective leading and trailing teeth 6, 7 articulately connected to their frames in the manner just described for left plow unit 2A.

Each leading tooth 6 carries at its bottom end a respective leading plowshare subelement or blade 10, and each trailing tooth 7 carries at its bottom end a respective trailing plowshare subelement or blade 11.

In FIG. 2, the upper edges (as viewed in FIG. 1) of the leading and trailing teeth 6 and 7 are visible. However, the portions of teeth 6, 7 below their upper edges are not visible in FIG. 2, first because FIG. 2 is a top view, and second because the lower portions of teeth 6, 7, and certainly the plowshare subelements 10, 11 at their bottom ends, are located beneath the soil level SL (see FIG. 1).

The plowshare subelements 10, 11 are secured to the bottom ends of the associated teeth 6, 7 by means of respective sets of screws as schematically indicated in FIG. 1. In this way, the plowshare subelements 10, 11 are mounted on the teeth 6, 7 fixed relative thereto for plow operation, but removable so that they can be exchanged for other plowshare subelements 10, 11. Preferably, each plowshare subelement 10 or 11 consists of two mirror-symmetrical halves screwed onto the bottom end of the respective tooth 6 or 7 in a fashion to sandwich such bottom end between the two halves of the plowshare subelement. In FIG. 1, the illustration of each of the two plowshare subelements 10, 11 includes a generally vertical broken line intermediate the leading and trailing ends of the plowshare subelements. The sandwiching of the bottom end of the respective tooth 6 or 7 between the two halves of the associated plowshare subelement takes place at the rear half of such subelement, i.e., rearward of such broken line. Forward of such broken line, the facing surfaces of the two halves of each plowshare subelement can of course merely abut against each other directly. In this way the general plane of each tooth 6 or 7 intersects the respective plowshare subelement 10 or 11 intermediate the outer lateral faces of the respective plowshare subelement. This inherently serves to laterally balance the load that results from soil resistance, so that each plowshare subelement transmits load back to its respective, generally planar tooth 6 or 7 without tending to transversely bend or vertically twist the generally planar tooth.

Figure 1B:
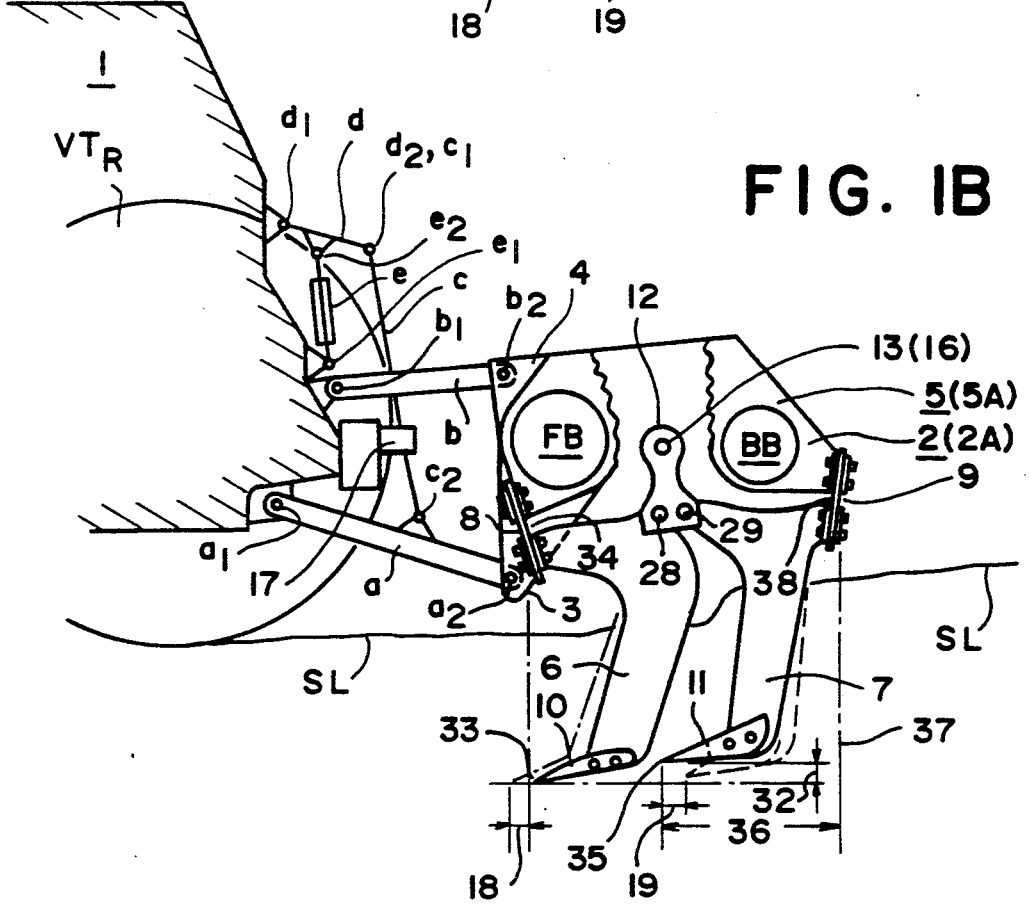
FIG. 1B is the same as the FIG. 1 view but with various structural elements, or parts of them, removed to expose to view the entirety of drive rod 12.

The leading and trailing teeth 6, 7 of plow unit 2A are articulately connected, at 28 and 29 respectively, to the bottom end of a drive rod 12 best seen in FIG. 1B. Drive rod 12 alternately performs an upward stroke and a downward stroke. During the downward stroke leading tooth 6 pivots clockwise about associated pivot location 34, whereas trailing tooth 7 pivots counterclockwise about associated pivot location 38. During the upward stroke of drive rod 12, leading tooth 6 pivots counterclockwise about associated pivot location 34, whereas trailing tooth 7 pivots clockwise about pivot location 38. FIG. 1 depicts (in solid lines) the pivoted positions of the leading and trailing teeth 6, 7 at the end of the upward stroke of drive rod 12 and (in broken lines) the pivoted positions of teeth 6, 7 at the end of the downward stroke of drive rod 12, the teeth 6, 7 always pivoting about the associated pivot locations 34 and 38, these being located intermediate the top and bottom ends of the respective flat spring 8 or 9. As indicated in FIG. 2, each of the three plow units 2A, 2B, 2C is provided with such a drive rod 12.

Such generally vertical reciprocation of drive rod 12 can of course be produced in any of a large variety of conventional ways, most typically being derived from some form of eccentric motion, i.e., using one or another of the various eccentric-motion-to-reciprocatory-motion motion-converting techniques that are elementary in machine technology. The reciprocatory-motion-generating mechanism that is indicated, merely schematically, in present FIGS. 1 and 2 includes a rotation-distributing drive shaft 16 which (as best seen in FIG. 2) transmits drive force to all three plow units 2A, 2B, 2C. The requisite journalling of drive shaft 16 at each one of the three plow units 2A, 2B, 2C is accomplished, in the reciprocatory-motion generator schematically indicated in FIGS. 1 and 2, by providing each of the associated two frame elements 5A, 5A'; 5B, 5B'; 5C, 5C' with a respective shaft-bearing portion 55, the shape of which is most clearly seen in the FIG. 1A detail view. These three pairs of shaft-bearing portions 55 are also visible in the FIG. 2 top view, and the one with which frame element 5A is provided is furthermore shown in the FIG. 1 side view, but is shown in the FIG. 1 view in broken lines inasmuch as, in that view, it is located directly behind a yet to be described circular flywheel 39. Drive shaft 16 is provided with three eccentric portions 13, one for each plow unit 2A, 2B, 2C (see FIG. 1 as to one of these three). The drive rod 12 of each plow unit has at its upper part a bore which accommodates the associated one of the three eccentrics 13, the drive rod 12 thus being mounted on the drive shaft 16 via the associated eccentric portion 13 thereon. Each eccentric portion 13 exhibits relative to the rotation axis of drive shaft 16 a degree of eccentricity which is small compared to the diameter of drive rod 16 in the schematically indicated motion-generating system, the degree of eccentricity being too small to be perceptible in either one of FIGS. 1 and 2. This small degree of eccentricity is sufficient in view of the fact that, in a plow in accordance with the invention, the amplitude of the generally vertical reciprocation performed by the lower end of drive rod 12 may amount to a value on the order of only about 10 mm or so. Although the top ends of the drive rods 12 are visible in FIG. 2, their lateral eccentric displacement relative to the rotation axis of drive shaft 16 is not perceptible in FIG. 2, first for the already mentioned reason that the degree of eccentricity is simply too small to be visually perceptible in any drawing made to a scale such as used for FIG. 2 and, additionally, is not perceptible in FIG. 2 for the reason that, as already mentioned, FIGS. 1 and 2 depict the situation wherein drive rod 12 has reached the end of its generally vertical upward stroke and is about to commence its downward stroke, in which situation the top end of drive rod 12 exhibits minimal lateral eccentricity when viewed, as in the FIG. 2 top view, from above.

As indicated schematically in FIG. 2, drive shaft 16 is driven by a drive motor 14 through the intermediary of a transmission 15. In FIG. 2, a pair of mounting brackets MB secured, e.g., by welding, flanges and bolts, or in any other conventional manner, mounts the transmission 15 or, as will be understood, the transmission housing. In turn, transmission 15, or the external housing thereof, mounts the drive motor 14, e.g., the external housing of drive motor 14. Drive motor 14 is preferably an hydraulic motor powered by hydraulic fluid received (via non-illustrated conduits) from an hydraulic pump 17 provided at the rear of the farm tractor 1.

The general manner of operation of the gang plow 2 of FIGS. 1–2 will now be explained for its own sake, but also to establish the basis for subsequent, further discussion of the shapes and dimensions of the already described elements.

During rotation of drive shaft 16, the drive rods 12, as already stated, perform generally vertical upward and downward strokes. In FIG. 1, drive rod 12 is shown at the end of its upward stroke, ready to commence its downward stroke, and the leading and trailing teeth 6, 7 occupy the positions shown in solid lines. As the downward stroke of drive rod 12 begins, leading tooth 6 begins to pivot clockwise about its associated pivot location 34. As a result, the leading share 10 at the bottom end of tooth 6 begins to move horizontally forward, moving from the shown solid-line position toward the shown broken-line position, which it reaches at the end of the downward stroke of drive rod 12. During this first time interval, the forward velocity of leading share 10, considered relative to the subsoil into which it is forwardly cutting, is comparatively high, being greater than the travel speed of farm tractor 1 by the amount of the forward vector component of the generally horizontally directed velocity of share 10. When then drive rod 12 after completing its downward stroke begins its upward stroke, leading tooth 6 begins to pivot counterclockwise about pivot location 34, and leading share 10 moves rearward from its broken-line position back to its solid-line position. During this second time interval, the forward (horizontal) velocity of leading share 10, considered relative to the subsoil, is comparatively low (if not indeed zero or negative, as discussed further below), being now less than the travel speed of farm tractor 1 by the absolute value of the forward (horizontal) vector component of the velocity of share 10.

Similar general remarks apply to trailing blade 7 and to trailing plowshare subelement 11 at the bottom end of the latter. Trailing blade 7 and share 11, however, move in phase-opposition to the leading blade and share. Specifically, during the first intervals, when drive rod 12 is performing its downward stroke and leading share 10 is moving forward relative to plow frame 5, trailing share 11 is moving rearward relative to the plow frame, from its shown solid-line position toward its shown broken-line position. Likewise, during the aforementioned second intervals, when drive rod 12 is performing its upward stroke and leading share 10 is moving rearward relative to plow frame 5, trailing share 11 is moving forward relative to the plow frame, from its broken-line position back to its solid-line position.

Thus, during operation, the leading and trailing plowshare subelements 10, 11 repeatedly move along predetermined respective paths of motion. In FIG. 1, numerals 18 and 19 respectively denote the magnitudes of those vector components of the respective paths of motion that are oriented in the purely forward (i.e., tractor travel) direction, here taken to be simply horizontal for the sake of simplicity.

As can be seen in FIG. 1, since cutting blade tip 33 of leading blade 10 oscillates back and forth through an arc directly below its pivot point 34, the movement of tip 33 is substantially horizontal. In contrast, blade tip 35 of trailing blade 11 oscillates at a distance 36 in front of its pivot point 38 so that its motion is not just back and forth but includes a substantial up and down component. As a result of these contrasting movements, the essentially horizontally moving leading blade 10 merely cuts the soil without substantially lifting the soil and the trailing blade 11 then lifts the soil which has already been cut.

In terms of function, each leading plowshare subelement 10 serves to cut free the bottom of a furrow slice, whereas each trailing plowshare subelement 11 serves to lift and then lower the material of the furrow slice, breaking up the compacted, constituent material thereof and thereby loosening the same. In this sense, the leading and trailing plowshare subelements 10, 11 respectively perform, more or less, the customary functions of the leading and trailing parts or halves of a traditional plowshare element, and in that general sense can be likened to the leading and trailing parts of a traditional plowshare element. There are however, various important differences:

(1) In the present invention, the leading and trailing shares (i.e., plowshare subelements) 10, 11 move along respective first and second paths of motion which are different from each other. In particular, leading plowshare subelement 10, chiefly responsible for continually cutting free the bottom of a furrow slice, performs motions which are substantially limited to the horizontal direction (or more precisely said, the tractor travel direction) and which exhibit at most a comparatively small vertical component. In contrast, trailing plowshare subelement 11, chiefly responsible for the lifting, and thereby the breaking-up and loosening, of the compacted material of the furrow slice, performs motions which exhibit a comparatively large vertical component.

(2) Because the two plowshare subelements 10, 11 are in fact structurally distinct and not different parts of a single plowshare element, the just-mentioned differences in the motions they perform can be such as cannot be achieved by the forward and trailing parts of a traditional single plowshare element, no matter how ingeniously the configuration of such single plowshare element be devised. In itself, this fact permits the first and second paths of motion respectively followed by the leading and trailing plowshare subelements 10, 11 to be designed with otherwise unavailable additional degrees of design freedom, making possible intensification of the actions respectively performed by the leading and trailing plowshare subelements 10, 11 without necessarily increasing the drive power needed to implement those intensified actions.

(3) A further, and extremely important consequence of such additional degrees of freedom in design and dimensioning is to be seen in the opening up of various design and dimensioning possibilities which can lead to improved, and even greatly improved, uniformity in the tractive power the towing vehicle need exert in towing the plow and which can lead, furthermore, to significant reductions in the average towing power required (i.e., quite apart from improvements in the uniformity of the required towing power). As discussed in the introductory part of the present patent, prior-art plows of the type capable of working in deep subsoil, and also those not especially adapted thereto but nevertheless so used, often present to the towing vehicle abrupt and very considerable increases or surges in tow-resisting load, of a magnitude that can exceed the peak towing power of which the typically available farm tractor is capable, so that such plows can be acceptably towed only by caterpillar-type vehicles of a type which the average farmer may not own. Increased uniformity in the tow-resisting load presented by an inventive plow can, by the absence of such high-magnitude load surges, make possible the use, in the first place, of an ordinary farm tractor of the type generally available on a farm, and obviate entirely the need for a caterpillar-type vehicle. The importance of the opening up of this possibility cannot be stressed enough. In addition, depending upon the degree to which and the manner in which the aforementioned further degrees of freedom in design and dimensioning are exploited, the resulting significant reduction in the average towing power required from the towing vehicle can likewise be of great significance. In a situation where a farm tractor is to be purchased and a given productivity (measured, e.g., in acres per hour) is required, it may be possible to acquire a tractor less powerful than otherwise. Alternatively, if the power capability that the farm tractor has or is to have is, for some reason, a given, then the reduction in the average towing power needed can often lead to a productivity greater than would otherwise result.

These advantages will now be discussed in greater detail:

As earlier described, during first time intervals the drive rod 12 performs its downward stroke, leading plowshare subelement 10 moves forwards relative to the plow frame, and trailing plowshare subelement 11 moves rearwards relative to the plow frame, whereas during second time intervals drive rod 12 performs its upward stroke, leading share 10 moves rearwards and trailing share 11 forwards.

Accordingly, during such first time intervals leading share 10 is moving at its maximum forward speed relative to the subsoil, and the tow-resisting (horizontal) load which the oncoming soil exerts against it will be comparatively high, whereas trailing share 11 is moving at its minimum forward speed relative to the subsoil, and the tow-resisting (horizontal) load which the oncoming soil exerts against it will be comparatively low. During the second time intervals the situation is reversed, the oncoming soil exerts comparatively high tow-resisting load against trailing share 11 and comparatively low tow-resisting load against share 10. Thus, during said first time intervals the towing power that must be exerted by the towing vehicle is to a maximum degree transmitted to leading share 10 and to a minimum degree transmitted to trailing share 11, whereas during said second time intervals the towing power that must be exerted by the towing vehicle is to a maximum degree transmitted to trailing share 11 and to a minimum degree to leading share 10. Because these first and second time intervals alternate, the towing power is, alternately, devoted to a maximum degree to the function of cutting free the bottom of a furrow slice by means of share 10, and then devoted to a maximum degree to the function of lifting, and thereby breaking-up and loosening, the compacted material of the furrow slice. This division, with respect to time intervals that alternate with each other, of the use to which the towing power is put inherently tends to contribute to the uniformity with respect to time of the tow-resisting (horizontal) load which the oncoming soil exerts upon the plow, and thus upon the towing vehicle. With intelligent design, this inherent tendency can be exploited to a greater and greater degree.

In particular the configurations of the leading and trailing shares 10, 11 and their respective paths of motion can be so devised that the tow-resisting load which the oncoming soil exerts upon leading share 10 during said first time intervals and that exerted upon trailing share 11 during said second time intervals are approximately equal to each other. This in itself can very significantly contribute to the uniformity with respect to time of the tow-resisting load which the towing vehicle need overcome, inasmuch as the first and second time intervals alternate with each other, and inasmuch as, preferably, the motions performed by the leading and trailing shares 10, 11 during the first and second time intervals are, more particularly, in phase-opposition to each other.

A yet further improvement can be achieved in the uniformity of the tow-resisting load with respect to time if, additionally, one establishes certain relationships among the speed of movement of leading share 10, that of trailing share 11, and, furthermore, that of the towing vehicle itself. The paths of motion respectively followed by the leading and trailing shares 10, 11 can be devised in such a manner that, in the ideal case, the horizontal (i.e., tractor-travel-direction) speed component of the rearward motion performed by leading plowshare 10 during said first time intervals and the horizontal speed component of the rearward and downward motion performed by trailing share 11 during said second time intervals are made equal to each other, or as nearly equal to each other as one wishes or finds practical. If the magnitudes of these two horizontal speed components are, furthermore, equal to the tractor travel speed, the following occurs. During said first time intervals, leading share 10 is moving rearward, relative to the subsoil, at a speed equal to that at which the tractor is travelling forward, so that during these first time intervals the leading share 10 is virtually at a standstill relative to the subsoil and the soil exerts upon share 10 substantially zero tow-resisting load. Thus, during these first time intervals, the soil exerts tow-resisting load substantially exclusively upon trailing share 11, and the towing power exerted by the towing vehicle is in effect being transmitted exclusively to trailing share 11. In contrast, during said second time intervals, it is the trailing share 11 that is moving rearward, relative to the subsoil, at a speed equal to that at which the tractor is travelling forward, so that it is now the trailing share 11 that is at a virtual standstill relative to the soil (more precisely said, as considered purely in the tractor-travel direction), and accordingly the soil exerts upon share 11 substantially zero tow-resisting load (more precisely said, as considered purely in the tractor-travel direction). Thus, during these second time intervals, the soil exerts tow-resisting (horizontal) load almost exclusively, or predominantly, upon the leading share 10, and the towing power exerted by the towing vehicle is in effect being transmitted almost exclusively, or predominantly, to the leading share 10.

Such transmission of the tractor's towing power, in alternation, almost exclusively, or at least predominantly, to the leading share 10 and then to the trailing share 11 inherently tends greatly to increase the uniformity with respect to time of the tow-resisting load against which the tractor need work, i.e., this being true to the degree that, as discussed earlier, the tow-resisting load exerted by the oncoming soil against the leading and trailing shares 10, 11 during, respectively, said first and said second time intervals, have been made equal to each other.

Conversely, and importantly, such transmission of the tractor's towing power, in alternation, almost exclusively, or at least predominantly, to the leading share 10 and then to the trailing share 11 greatly facilitates the designer's task in devising, or modifying, the configurations and paths of motion of the shares 10, 11 to achieve a situation in which the tow-resisting load exerted by the oncoming soil against the leading and trailing shares during, respectively, said first and second time intervals is, in fact, equalized, or approximately equalized. Facilitation of the designer's task in this sense results from lessened interrelationship or interdependence between the power required by the leading share and that required by the trailing share. For example, if the designer observes that the trailing share is consuming a first amount of towing power and the trailing share a different second amount, then to a great degree the task of modification need involve only increasing said first amount, or alternatively decreasing the same, or alternatively increasing said second amount, or alternatively decreasing the same, depending of course upon whether such increase or decrease of the first or second amount would result in exceeding the expected towing power or, in the opposite case, would result in failing to fully enough utilize the expected towing power, etc.

If the load uniformity improved discussed above is to be achieved, then as a rule the leading share 10 will be smaller than the trailing share 11; i.e., the surface that share 10 presents to the oncoming soil during its forward stroke will in general be smaller than that which share 11 presents during its own forward stroke. This follows inherently from the desire to make equal the horizontal load component exerted by the soil against share 10 during the active stroke thereof and the horizontal load component exerted by the soil against share 11 during its active stroke. As a rule, the work performed by share 10 during its active stroke will be greater than that performed by share 11 during its own active stroke. Share 10 must cut into deep, compacted, and most likely root-entangled subsoil, tearing forwards into the same. In contrast (and as will be described in further detail below), trailing share 11 does not in the shown embodiment tear forward into oncoming compacted subsoil, but instead chiefly receives the furrow slice interval whose bottom the leading share 10 has already cut free, and then mainly just lifts the received furrow slice interval. Such work tends, usually, to be less power-consuming. Therefore, if one does desire to equalize the horizontal load component exerted by the oncoming soil upon the leading and trailing shares 10, 11 during their respective active strokes, it follows, as already said inherently, that one will tend to have to select the trailing share 11 larger than the leading share 10. As to how much smaller share 10 is compared to share 11, a general ratio or the like cannot be stated, for reasons that by now should be clear: If the soil to be worked is most extremely compacted, hard, and densely root-entangled, leading share 10 will be more greatly loaded than if the soil being worked is, for example, only moderately compacted and not greatly root-entangled. Accordingly, if one wishes to achieve the horizontal-load-component equalization discussed earlier, it does as a rule follow inherently that share 10 will be smaller than share 11, but by how much depends upon all the circumstances. (As earlier noted, the shares 10 and 11 are mounted at the bottom ends of teeth 6, 7 by means of screws, so as to be fixed relative to the teeth 6, 7 during plow operation but still be removable in order to be exchangeable for other shares 10, 11.)

In the preferred embodiment shown in FIGS. 1-2, the leading share 10 performs a reciprocation mainly in the horizontal direction (tractor-travel direction) of magnitude 18 as considered in that direction, whereas trailing share 11 performs a reciprocation having a horizontal component of magnitude 19, comparable to magnitude 18, but also a vertical component of magnitude 32. These differences in the paths of motion of shares 10 and 11 correspond to the different functions of the shares, already described.

In the preferred embodiment, these differences in the two paths of motion are achieved despite the fact that the two teeth 6, 7 on which the shares 10, 11 are carried, are articulately mounted in generally the same manner, and indeed in pivotal fashion so that both move essentially along arcs of circles. In the illustrated preferred embodiment, the differences in the two paths of motion are established by choosing the relative positions of the pivot location and the leading end of each share differently for the two shares.

Specifically, tooth 6 is of such a shape, and connected to flat spring 8 and drive rod 12 at locations such, that during the generally horizontal reciprocation of leading share 10 its leading end 33 remains substantially vertically below the effective pivot location 34 of the associated flat spring 8. As a result, leading share 10, although in fact reciprocating along the arc of a circle whose center is at pivot location 34, performs as already stated a generally horizontal reciprocation. The magnitude 18 of this reciprocation may be on the order of, for example, about 30-50 mm. In contrast, the leading end 35 of trailing share 11, during its reciprocations, is always located a considerable distance (see reference numeral 36) forward of an imaginary vertical line 37 that passes through the effective pivot location 38 of the associated flat spring 9. It is very advantageous that the differences in the paths of motion required, in the preferred embodiment, for the leading and trailing shares can, in accordance with this particular concept of the invention, be established in so very simple a manner, i.e., the share-carrying blades 6 and 7 both being driven off of the same eccentric-driven drive rod 12, directly, without intermediate means, and this despite the fact that blades 6 and 7 are positioned in tandem fashion, namely one behind the other.

The preferred embodiment, shown in FIGS. 1 and 2, incorporates a number of further inventive concepts, relating to the angle of incline of the shares 10, 11 and relating to the vertical heights of the shares 10, 11 relative to each other. These will now be discussed.

As clearly shown in FIG. 1, both the leading share 10 and the trailing share 11 are wedge-shaped, the use of wedge-shaped plowshare-like implements being of course not unconventional. As can be seen, the two shares 10 and 11 have substantially equal working angles (i.e., angles of incidence; the angles of inclination of their upper faces, namely the faces which the two shares present to oncoming soil during their respective forward motions). Although trailing share 11 is located behind leading share 10, it is in general located somewhat higher than share 10. Inasmuch as leading share 10 performs, substantially, a purely horizontal motion, the height of its leading end 33, and of its trailing end as well, can for simplicity be considered constant. The leading end of trailing share 11 is, in the preferred embodiment shown in FIGS. 1-2, located higher than the leading end of leading share 10, the more so during the forward stroke of trailing share 11, at the conclusion of which its leading end 35 is higher by a distance 32 than the leading end 33 of share 10. Also, the leading end of trailing share 11 is located at roughly the height of the trailing end of share 10, and almost exactly at such height at the conclusion of the active, forward stroke of trailing share 11. These relationships concerning working angles and relative vertical heights bring about various advantages, the more so when used in conjunction with each other, and yet more so when used in conjunction with the paths of motion followed by the two shares 10, 11 in the preferred embodiment shown in FIGS. 1-2:

(1) Generally said, the leading end of trailing share 11 receives, more or less directly from the trailing end of leading share 10, the interval of the furrow slice just cut free by leading share 10, and then proceeds to lift it, so as to break up and loosen the compacted material of that furrow slice interval. Thus, as mentioned earlier, in a broad sense the two shares 10, 11 really do cooperate to act like two subelements of a conventional unitary or single share element. Although already noted, it is stressed again that leading plowshare subelement 10, like the leading part or leading half of a single plowshare element, is mainly responsible for cutting free the bottom of the furrow slice, whereas the trailing plowshare subelement 11, like the trailing part or trailing half of a single plowshare element, is mainly responsible for lifting, breaking-up and thus loosening the compacted material of the furrow slice. However, as likewise already noted, because of what can be viewed as the inventive subdivision of a single plowshare element into two distinct plowshare subelements, each following a respective path of motion highly optimized with regard to the function that the particular subelement is to perform, the two plowshare subelements 10, 11, considered together, act with an efficiency and powerfulness that could never be achieved by a unitary or single plowshare element, no matter how ingeniously the shape and path of motion of such single plowshare element might be devised.

(2) In connection with this aspect, it is worth emphasizing that the two subelements 10, 11 act upon the same layer of subsoil. (Otherwise, it of course would not be apt to view the two subelements 10, 11 as likenable to the leading and trailing parts of an idealized unitary or single plowshare element.)

This stands in clear contrast to prior art of the type in which two plowshare elements per furrow are indeed provided, and indeed located one behind the other, but located at quite different respective depths, so as to act upon two quite distinct subsoil layers, for whatever reason, and with whatever intended beneficial result.

Indeed, the preferred embodiment of FIGS. 1-2 stands in marked contrast to prior art of the type wherein the leading plow or tool is located considerably higher than the trailing one and wherein, accordingly, the trailing tool must penetrate forwardly (due forward tractor travel) into a subsoil layer not yet worked at all. In such prior art it cannot be said that the two tools act whatsoever like leading and trailing subelements of a unitary or single idealized plowshare element.

(3) In the preferred embodiment shown in FIGS. 1-2, as already stated, the leading share 10 performs a mainly horizontal reciprocation, so that during its forward stroke its forward speed is greater than the tractor travel speed. This stands in contrast to prior-art plows, whether agricultural or otherwise, wherein the leading share does not reciprocate at all, or reciprocates chiefly in the vertical direction, but in any event performs no substantial horizontal reciprocation.

In such prior art, the leading share cuts loose the bottom of a furrow slice with only the speed of forward tractor travel, whereas present leading share 10 does so at a greater speed and, inherently, with greater power. The fact that the leading share 10, during its rearward stroke, in the most preferred case, has zero horizontal velocity relative to the subsoil and consumes substantially zero power, does not render illusory this difference relative to such prior art. This is because the soil of the furrow slice into which the leading share must cut will, at the considerable subsoil depths here intended, not merely be highly compacted and difficult to penetrate for that reason but, additionally, will very often contain a dense growth of root material whose presence will often constitute the chief resistance to the cutting loose of the bottom of a furrow slice. With the preferred action repeatedly described above for leading share 10, the inactive rearward stroke accordingly constitutes a positive advantage in the added sense that the share 10, before a forward cutting action, flees rearwardly from the oncoming soil and then reverses to attack the oncoming soil with a greater than usual speed and with a force greater than otherwise. This begins to approximate to a true forward hacking action, able to cut through even very dense root systems, which cannot be comparably achieved by a leading (or trailing) share that must cut loose the bottom of a furrow slice by mere continuous penetration into the oncoming soil at merely the velocity of forward tractor travel.

(4) A further advantage of the fact that leading share 10, in the preferred embodiment, reciprocates almost exclusively in the horizontal direction is the absence of a stomping effect. In prior-art plows such as described earlier, in which the leading share or tool performs a reciprocation having a substantial (or only) a vertical component, the leading share or tool during its downward stroke stomps upon still compacted soil. Whatever advantage may be achieved or intended to be achieved during the upward stroke, such downward stroke constitutes a useless or wasted motion; constitutes a potentially counterproductive motion, in so far as it may lead to further compaction of already compacted subsoil into which the trailing share or tool must then forwardly penetrate (if the trailing tool is, as usual, located deeper than the leading tool); and furthermore constitutes a waste of whatever power is consumed for the downward stomping action performed by the leading tool. Also, during the time that stomping of such a tool upon the subsoil beneath it is occurring, the tool bottom is of course in tight frictional engagement with the subsoil directly beneath it, this exerting a braking action that resists towing, i.e., in addition to all else that resists towing. When the path of motion of the present leading share 10 is devised in the preferred manner explained hereinabove, such a stomping action occurs not at all, or to a negligible degree. This further contributes to smoothness and quietness of operation, and of course to reduction in the required tractive power.

(5) Because, in the preferred embodiment of FIGS. 1-2, the trailing share 11 is in the already explained manner located somewhat higher than the leading share 10, trailing share 11 likewise performs no stomping action.

This may be somewhat more difficult to see, inasmuch as share 11, unlike share 10, reciprocates with a substantial vertical component. It is therefore to be pointed out that trailing share 11, even at the conclusion of its downward (and rearward) stroke, remains generally above the depth of the leading end 33 of leading share 10. Accordingly, it does not substantially descend to any depth below the level of the bottom of the furrow slice interval just cut free by the leading share 10, and therefore does not stomp upon compacted subsoil not already worked by leading share 10. Indeed, this will continue to be the situation, even if the towing vehicle is travelling upon an upward or downward incline.

This stands in great contrast to prior-art plows wherein the trailing share or tool is located behind the leading share or tool, but works at a greater depth than the leading share or tool. Indeed, compared to such prior art, the actions per-formed by the trailing share 11 are quite different, when the relationships preferred herein are used in a sufficient number and to a sufficient degree. In particular, at the start of its upward (and forward) stroke, trailing share 11, as already noted, essentially receives the furrow slice interval whose bottom has just been cut free by leading share 10, and then proceeds to lift the compacted material of that furrow slice interval, to break up and thus loosen the same. Then, during its downward (and rearward) stroke, trailing share 11 performs chiefly a release or relief action, in which the material of the furrow slice is lowered, the weight of such material inherently assisting such lowering, not resisting it. The fact that trailing share 11, during this downward stroke, performs no undesirable stomping action has already been noted. It has also been noted already, but is worth repeating at this point, that during this downward (and rearward) stroke of trailing share 11, it will, in accordance with a preferred aspect of the invention, be fleeing rearwardly from the oncoming soil and exhibit zero horizontal velocity relative to the subsoil. Thus, not only is power not being wasted by a (here avoided) downward stomping action, but in addition power is not being consumed to any substantial degree, in any regard.

(6) The fact that, in contrast to prior-art plows of the type just discussed, neither the leading share 10 nor the trailing share 11 performs any downward stomping action upon unworked compacted subsoil leads to a very considerable improvement in the smoothness and quietness of operation of the gang plow during towing of the same, an advantage widely desired in the art and here actually achieved, for reasons that should by now be clear.

This improvement in the smoothness and quietness of operation is in addition to the earlier-described improvement resulting from the increased uniformity of the tow-resisting load.)

The foregoing advantages relate principally to the subdivision of a unitary or single plowshare element into leading and trailing plowshare subelements which follow different respective paths of motion in order to cooperate, in their work upon the same subsoil layer, in a fashion which a unitary plowshare element cannot ever do. In the preferred embodiment shown in FIGS. 1-2, the shares 10, 11 are mounted on the plow frame, for motion relative thereto, in a certain manner already described, involving the use of teeth 6, 7 having the form of two-armed levers, flat springs 8, 9, a common drive rod 12 serving as the drive element for both teeth 6, 7, etc. After disclosure of these preferred aspects of the manner of mounting the shares 10, 11, it will be apparent that numerous other ways of mounting them would also be possible. However, the described and shown preferred aspects of the manner of mounting shares 10, 11 are indeed preferred because they provide various advantages, which will now be discussed:

(1) In the shown preferred embodiment, the particular paths of motion devised for the shares 10, 11 are implemented by imparting corresponding motion to the respective teeth 6, 7 at whose bottom ends the shares are fixedly mounted. Most important, these motions that are imparted to the teeth 6, 7 are imparted to them aboveground. Implementation of the paths of motion devised for shares 10, 11 does not involve the use of any articulate connections located belowground.

This stands in marked contrast to prior-art plows of the type in which the paths of motion devised for the shares or blades are implemented using transmission linkages that include linkage rods, or the like, which extend down from an aboveground drive into the soil to the depth at which the shares are located, at which subsoil depth they are articulately connected to the shares, whether directly or indirectly. It may be that the shares are carried by no means other than these linkage rods, or it may be that the shares are carried at the lower ends of teeth, being articulately connected to the teeth for pivoting movement relative thereto. In such prior-art plows, where the shares or blades are articulately connected to the lower ends of the linkage rods, or are articulately connected to the bottom ends of the teeth and also to the lower ends of such linkage rods, the subsoil articulate connections inherently tend to become clogged by subsoil, root growths, etc., and become contaminated by erosive soil components, so that encapsulated bearings, and the like, must be used at the locations of belowground articulate connection. Also, as mentioned in the introduction of the present patent, one may as a result not be free to select the shapes and sizes of the share or blade elements purely in accordance with their plowing-related functions, namely if their shapes and sizes must be selected, additionally, to provide coverage or protection for such points of subsoil articulate connection, generally located beneath and back of a share. This can lead to a requirement for shares of a shape and/or size different from (for example larger than) what is actually needed for plowing-related purposes, and indeed increase the required towing power for reasons not relating to plowing effectiveness.

Clearly, the situation is quite different, and greatly improved, in the preferred embodiment of the present invention where, as shown in FIG. 1, all points of articulate connection being located aboveground.

(2) As repeatedly stated already, leading share 10 performs in the preferred embodiment an almost purely horizontal reciprocation. Given the disclosure of this concept, it will be clear that various means may be employed to implement it, such as the use of sliding pivots, appropriately designed rectangular pivoting linkages, etc. In the shown preferred embodiment, it is particularly advantageous that, in contrast to such complicated techniques, the horizontal reciprocation is implemented using merely one pivotal connection, namely that at 34. (As already explained, the possibility of using so simple a technique involves so designing the tooth 6 that during reciprocation of share 10 its leading edge 33 always remains, approximately, directly below the pivot location 34 relative to which it is swinging.)

(3) The use of flat blade or leaf springs 8, 9 to establish the pivot locations 34, 38 for the leading and trailing teeth 6, 7 is very advantageous. These two pivot locations 34, 38 could be established using sliding bearings exhibiting bearing play. However, sliding bearings exhibiting bearing play would require lubrication with related increased costs. Unlike bearings exhibiting bearing play, the use of the flat springs 8, 9 obviates the need for lubrication. Indeed no particular form of service or maintenance whatever is required, and the service life of the flat springs 8, 9 is of course extremely long.

Figure 4:
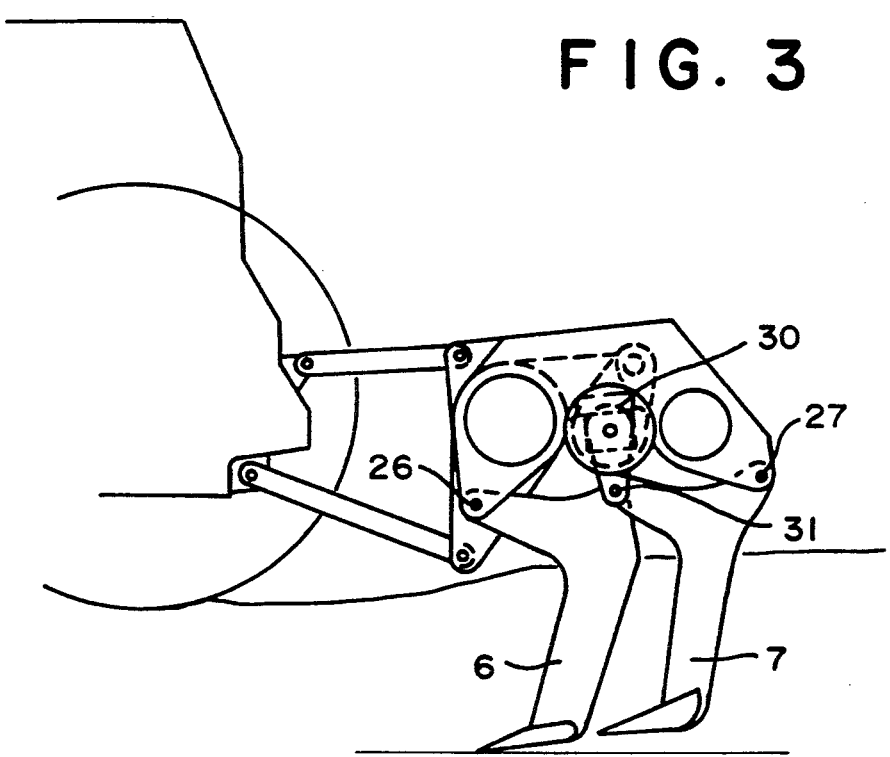
FIG. 4 is a view, similar to the FIG. 1 side view, but of a modification of the embodiment of FIGS. 1-2.

Also, during use of the gang plow, it will occur that, on occasion and perhaps with some frequency, the subsoil structure will be such that the load exerted by the soil against the shares 10, 11 and/or against the teeth 6, 7 will include a substantial lateral component (directed normal to the picture plane in FIG. 1). The flat springs 8, 9, being very stiff but nevertheless elastic members, can suffer the resulting transverse or twisting strain and then fully recover from it. In contrast, sliding bearings that exhibit bearing play would be far less able to do this, especially for example if the load laterally exerted upon, e.g., tooth 6 were to be briefly of considerable magnitude and concentrated, for whatever reason, near the bottom of tooth 6, so as to be transmitted to the pivot location 34 through the intermediary of the full length of tooth 6, and thus with high mechanical advantage. After a certain period of use, sliding bearings having bearing play employed in place of the preferred flat springs could, as a result, begin to permanently deform, which could lead to a certain degree of overall structural ricketiness. Accordingly the alternative use of sliding bearings exhibiting bearing play would be less preferred compared to the use, shown in FIGS. 1-2, of the flat springs 8, 9. (FIG. 4 depicts an alternative embodiment of the invention, in which the flat springs 8, 9 are replaced by appropriate hinges or bearings 26, 27, respectively. In this alternative embodiment, the drive rod 12 with its two points of articulate connection 28, 29 is replaced by a drive rod 30 having a single point of articulate connection 31 to which both teeth 6 and 7 are articulately connected.)

(4) In the preferred construction shown in FIGS. 1-2, the two teeth 6, 7 are both two-armed levers, having one end secured to the flat spring 8 or 9, an opposite end carrying the plowshare subelement 10 or 11, and an intermediate portion at 28 or 29 articulately connected to the common drive rod 12. The upper arm of lever 6 extends rearward from pivot location 34 to drive connection 28, whereas the upper arm of lever 7 extends forward from pivot location 38 to drive connection 29.

As a result, the two pivot locations 34, 38 are spaced from each other about as widely as possible, this inherently tending to impart a high degree of structural stability to the plow as a whole. Furthermore, because the upper arms of teeth 6, 7 extend from their respective pivot locations to almost meet each other at their aforesaid intermediate portions, not only is it particularly easy to employ a common drive rod 12 but, equally important, the drive can be located approximately midway between the pivot locations 34, 38, which inherently tends to make for a kinematically well-balanced construction.

(5) The lower arms of teeth 6, 7 extend downward from the drive connections at 28, 29 for roughly equal vertical distances. This is here done for reasons, already explained, concerning the elevations of the leading and trailing share sub-elements 10 and 11 relative to each other. However, a side-benefit of the roughly equal lengths of these lower arms is the inherent tendency to foster good mass equalization, especially considered in the horizontal direction or, in the terms employed further above, improved uniformity of the tow-resisting load. (For example, if leading share 10 were considerably higher than trailing share 11, with the lower arm of tooth 6 considerably shorter than that of tooth 7, and with all other dimensional relationships unchanged, the tow-resisting load exerted by the soil against share 10 would be transmitted to the drive via a comparatively short lever arm, whereas that exerted against share 11 would be transmitted via a comparatively long lever arm, and the mass equalization, or uniformity of the tow-resisting load, would be greatly altered, to a degree requiring extensive redesign of many fundamental geometric and dimensional relationships. As already stated, this particular benefit of the approximate length equality of the lower arms of teeth 6, 7 is, at least in the preferred embodiment, to be considered a side-benefit.)

Although the flat springs 8, 9 offer various advantages such as discussed above, it is to be kept in mind that they are not in any sense comparable to a springy suspension of the type used in certain prior-art plows for the purpose of setting the entire plow, or the chief operative components thereof, into indeterminate vibratory motion. On the contrary, the flat springs 8, 9 of the shown preferred embodiment must be stiff, because they constitute essential parts of the means for establishing completely predetermined (and differing) paths of motion for the leading and trailing shares 10, 11, and must operate to establish such paths of motion with a kinematic definiteness as great as would be provided by, for example, a polygonal lever system. Indeed, the use of such flat springs 8, 9 is practicable, to a great degree, for the reason that the teeth 6, 7 perform swinging motions of comparatively small amplitude.

To increase the practicability of such flat springs, and to maximize their service life, the invention contemplates various relationships concerning the directions in which the springs 8, 9 and other components extend, relative to the directions of the various forces that develop during plow operation. These further advantageous concepts of the shown preferred embodiment will now be discussed with regard to FIG. 3.

Figure 3:
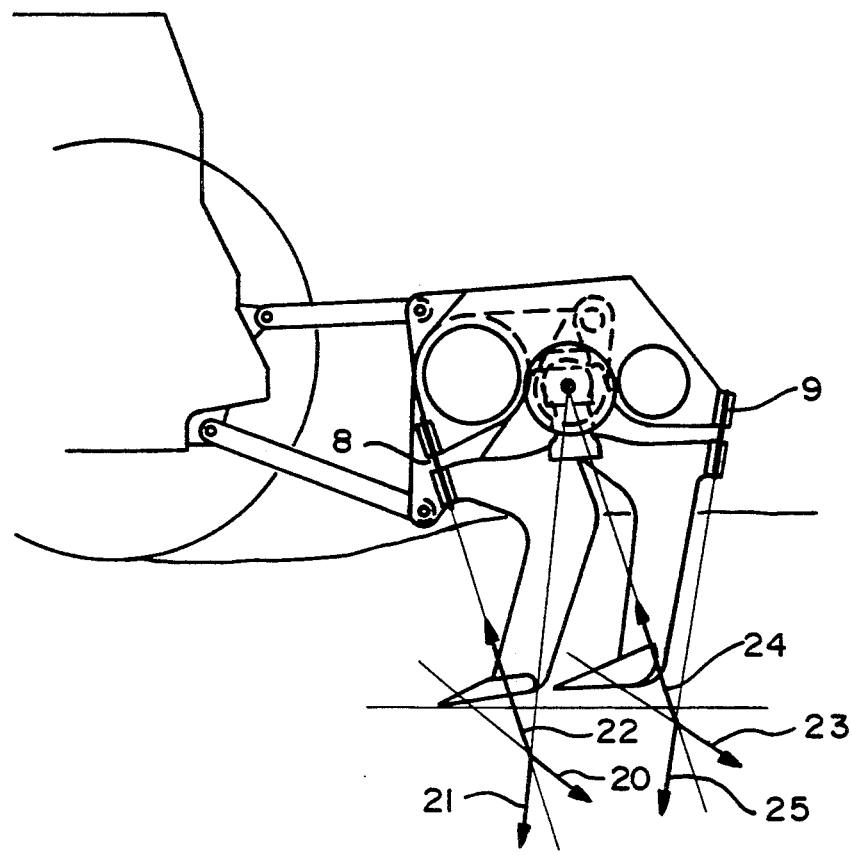
FIG. 3 is a view similar to FIG. 1, illustrating various forces which arise during operation of the shown plow.

FIG. 3 depicts in an idealized manner the directions of the chief forces arising during plow operation. FIG. 3 serves to convey a very great amount of information and guidance concerning the most preferred relationships among the most important dimensions and orientations of the main components of the preferred embodiment, by illustrating in vectorial fashion the preferred or ideal design solution. By illustrating such solution in terms of vectorial directions, it becomes unnecessary to enter into lengthy and abstruse verbal instructions, or complicated empirical formulae, to guide designers in their work.

Numeral 20 indicates the general downward and rearward direction of the load exerted by the oncoming soil against leading share 10 as the latter moves forward relative to the subsoil to cut free the bottom of a furrow slice increment. The component 21 of the counteracting force attributable to drive rod 12 is directed downward, because the forward stroke of share 10 is implemented during the downward stroke of the drive rod. Force 21, being directed downward and forward, can and does counteract the rearward horizontal component of the soil load 20 but, being also a downward force, cannot counteract the downward component of soil load 20, which task thus passes to flat spring 8, the latter exerting a holding force 22 that includes a substantial vertical component exerted in the upward direction. Despite the stiffness of flat spring 8, it can be overloaded if subjected to a too great bending force. In the idealized situation shown in FIG. 3, the bending force exerted upon flat spring 8 is minimized by intelligent selection of the direction in which flat spring 8 longitudinally extends. As already noted, the downward force 21 of drive rod 12 can only incompletely counteract the downward soil force 20. The vector sum of forces 20 and 21 thus represents the yet uncounteracted vectorial remainder of the soil force 20, and is exerted in a certain direction, and downwards. In accordance with a particular concept of the invention, as it relates to the shown preferred embodiment, the direction in which flat spring 8 longitudinally extends ideally should coincide with the direction of this vectorial remainder, and does so in the idealized showing in FIG. 3. Thus flat spring 8 is called upon only to exert an upward force 22 whose direction coincides with its own direction of elongation.

In FIG. 3 the situation is similar for trailing share 11. The chief difference is that share 11 is subjected to soil force 23 during the upward stroke of drive rod 12, which latter accordingly exerts a partially counteracting force 24 the vertical component of which is directed upwards, not downwards. As before, the vector sum of forces 23 and 24 thus represents the yet uncounteracted vectorial remainder of the soil force 23, and is exerted in a certain direction, and upwards. Again as before, the direction in which flat spring 9 longitudinally extends ideally should coincide with the direction of this vectorial remainder, and does so in the idealized showing in FIG. 3. The flat spring 9 is thus called upon only to exert a downward force whose direction coincides with its own direction of elongation.

The highly idealized character of FIG. 3 is no less valuable, but rather more so, for being so idealized. That it is in fact an idealized showing should be self evident: If in actuality the only forces exerted upon and exerted by flat springs 8 and 9 were to coincide perfectly with their respective directions of elongation, they would never have cause to bend, whereas during operation of the plow they most certainly do bend. Likewise, it will be self-evident that none of the shown forces 20–25 remains constant in both direction and magnitude during one entire cycle of operation of the plow, it being clear that the indicated directions and relative magnitudes are instead typical or representative of the various directions and magnitudes that these forces will exhibit during one complete cycle of plow operation.

If the various preferred, and most preferred, concepts of the invention, described above, are all employed, then the (horizontal) tow-resisting load against which the tractor must work is made uniform. However, the substantial vertically directed work that trailing share 11 performs during its reciprocations is not, in the shown embodiment, similarly counterbalanced, because the motion of leading share 10 does not, in the first place, include any substantial vertical component.

Therefore, in the embodiment shown in FIGS. 1-2, each plow unit 2A, 2B, 2C is provided with a respective pair of flywheels 39 mounted on drive shaft 16. These serve to assist motor 14 in driving share 11 as the latter performs its upward and forward stroke, during which share 11 requires comparatively high power, and then serve to add to the work that motor 14 must perform as share 11 subsequently performs its downward and rearward stroke, during which share 11 requires comparatively little power. In this way the load against which the tractor's engine need work, exclusive of the load component attributable to horizontally directed load components exerted by the oncoming subsoil, is made to exhibit improved uniformity with respect to time, in this sense as well. Also, the three pairs of flywheels 39 serve, secondarily, to counterbalance any load non-uniformities that may be attributable to the three eccentrically driven drive rods 12.

It can be seen that teeth 6 and 7 ar designed so that by their opposite movement a horizontal mass equilibrium is obtained. At the same time, the vertically moving tooth mass and the influence of drive 12 are compensated for by the centrifugal weights of flywheels 39. These weights act as means for compensating movable masses. Such equalizing centrifugal weights on drive shafts have been known in the past but they have not been used for optimization.

The use of flywheels in gang plows is already known, as mentioned in the introduction, for example in Rogers U.S. Pat. No. 3,451,487. There, completely predetermined paths of motion for the share-like implements are not established. Instead, the gang-plow frame as a whole is to be set generally into vibratory motion with the aid of a springy suspension. Two flywheels are employed, both of them eccentrically mounted, one being adjustable with regard to angular position on a shaft, the other not being thusly adjustable. The angular interval between the two eccentrically mounted flywheels can be varied, to vary the character of the general vibratory motion of the plow. Accordingly, to make clear the situation in the embodiment shown in present FIGS. 1 and 2, it should be noted that, here, the flywheels 39 are not being used to generate vibratory motion to be imparted to the gang plow. Instead they are being used to counterbalance, and ideally cancel, residual fluctuations in the load presented by the plow to the engine of the tractor and/or to the hydraulic motor 14, i.e., load fluctuations such as may not have been already counteracted as a result of one or more or all of the various measures described further above.

As stated much earlier, it is preferred that the gang plow 2 be attached to the rear of tractor 1 using a lever-linkage system of the general type very schematically indicated at a, b, c, d, and that the gang plow frame not be provided with plow-weight-supporting wheels of its own. Plows or plow-like machines provided with weight-supporting wheels of their own inherently can move up and down relative to the towing tractor, for example when the plow is ascending along the leading, upward slope of a short elevation of the soil surface SL at the same time that the tractor 1 is beginning to descend along the trailing, downward slope of the same soil elevation. In contrast, when the plow is mounted on the tractor rear by means of a lever-linkage system of the well known type in question, the plow frame is during operation incapable of upward or downward movement, considered relative to the towing vehicle. Inherently, this tends to maintain the shares 10, 11 at a given depth of penetration into the subsoil, because the connection to the towing vehicle is of such a character as to forcibly maintain the shares 10, 11 pushed down into the subsoil to the desired depth. In addition to this inherent effect, the use of such a mounting linkage is of especial value in the preferred embodiment of FIGS. 1-2, because of the play of forces that then occurs between, on the one hand, the towing vehicle and, on the other hand, the blades 6, 7 (and of course the plowshare subelements 10, 11 mounted at their lower ends).

(For example, in FIG. 3, the idealized relationships among the various forces 20-25 have already been explained. It will be understood that, if the plow were free to move up and down, considered relative to the towing vehicle, then for example the magnitudes and/or directions of the soil forces 22 and 23 could depart considerably from their shown, generalized values and orientations and, more important, vary very considerably with respect to time from these values and orientations. As a result it could become very much more difficult or impossible to generalize, in the manner of FIG. 3, the magnitudes and orientations of these forces. In that event, and as a logical consequence, the designer's work could become quite complicated and laborious, even so much so as to frustrate entirely his desire to achieve the improved uniformity to be exhibited by the total load with respect to time.)

It will be understood that each of the elements described above, or two or more together, may also find a useful application in other types of constructions differing from the types described above.

While the invention has been illustrated and described as embodied in a particular gang-plow design configured to operate at relatively deep subsoil levels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An earth working implement capable of being arranged for movement over ground in a predetermined direction, which implement comprises a pair of elongate members which in use of the implement extend into the ground and are drawn therethrough in said direction, means for supporting said pair of elongate members, the first of said pair of elongate members being located forward of the second of said pair in said direction, a soil cutting device secured to said first elongate member, a soil lifting device secured to said second elongate member, means to move said first elongate member so that said soil cutting device moves in a substantially horizontal path back and forth relative to said supporting means to cut soil in said ground, means to move said second elongate member so that said soil lifting device moves in an oscillating path having a substantial vertical component to lift said soil after it has been cut by said cutting device.

2. The earth working implement of claim 1 wherein the elongate members in said pair are of substantially equal length.

3. The earth working implement of claim 1 wherein said cutting device and said lifting device take turns in performing their respective operations.

4. The earth working implement of claim 1 wherein said path of motion of said lifting device also has a substantial horizontal component.

5. The earth working implement of claim 4 wherein said horizontal motion of said soil cutting device relative to said supporting means is always opposite to the horizontal component of motion of said soil lifting device.

6. The earth working implement of claim 1 which includes means to maintain the speeds of forward and backward motions of said cutting device relative to said supporting means so that they are substantially equal in magnitude to the speed of movement of the earth working implement relative to the ground.

7. The earth working implement of claim 1 wherein said means to move said first elongate member moves said first member about a first pivot point and said means to move said second elongate member moves said second member about a second pivot point.

8. The earth working implement of claim 7 wherein said first pivot point is located substantially directly above the center of the substantially horizontal back and forth path of said cutting device and wherein said second pivot point is located a substantial horizontal distance from an imaginary vertical line extending through the center of the oscillating path of said lifting device.

9. The earth working implement of claim 1 wherein said means to move said first elongate member and said means to move said second elongate member are both driven by a single driving rod.

10. A soil loosening device, comprising a frame mountable on a pulling vehicle for pulling said frame in a predetermined direction, a leading supporting means mounted on said frame and a trailing supporting means mounted on said frame behind said leading supporting means relative to said predetermined direction, said leading supporting means mounted to partially rotate around a first pivot point onsaid frame, said trailing supporting means mounted to partially rotate around a second pivot point, a cutting device mounted on said leading supporting means and a lifting device mounted on said trailing supporting means, movement means for simultaneously causing said leading and trailing supporting means to execute reciprocating movements around their respective pivot points in rotational directions opposite to each other, said cutting device executing a reciprocating motion in an arcuate path directly below said first pivot point, said lifting device executing a reciprocating motion in an arcuate path forward of said second pivot point with respect to said predetermined direction.

11. A loosening device as defined in claim 10, wherein said movement means moves said cutting and lifting devices so that the magnitude of the horizontal speeds of said cutting devices relative to said vehicle are substantially equal to the speed of the vehicle relative to the ground.

12. A loosening device for deep loosening of compacted mainly agriculturally used soils, comprising a frame adjustably mountable on a pulling vehicle; two blades provided for each loosening furrow and forming a cooperating joint blade surface subdivided into two separately supported and separately movable blade partial surfaces; two teeth for each loosening furrow mounted one behind the other on said frame and each carrying one of said blades; and drive means for said teeth with said blade partial surfaces mounted thereon, for med so that a front one of said blade partial surfaces, operative for a cutting step, and a rear one of said blade partial surfaces, operative for a lifting step, form in a tandem arrangement said joint blade surface with said partial surfaces alternately performing the cutting step and subsequently the lifting step, wherein said teeth are mounted pivotally and subjected to resulting holding forces; and further comprising means for pivotally mounting said teeth and including flat springs which are arranged in directions of the resulting holding forces.

13. A loosening device as defined in claim 12, wherein said drive means is formed so as to drive said partial blade surfaces in opposite movements.

14. A loosening device as defined in claim 12, wherein said drive means drives said blades via said teeth so that the magnitude of the horizontal speeds of said blades relative to said frame is substantially equal to the speed of the pulling vehicle.

15. A loosening device as defined in claim 12, wherein said teeth and said blades include front and rear teeth and front and rear blades respectively, said front tooth being arranged pivotally about a pivot point, said front blade having a blade tip which is located substantially vertically under the pivot point of said tooth.

16. A loosening device as defined in claim 12, wherein said teeth and said blades include front and rear teeth and front and rear blades respectively, said rear tooth being mounted pivotably about a pivot point, said front tip of said rear blade being located at a substantial distance from a vertical line extending through said pivot point of said rear tooth.

17. A loosening device as defined in claim 12, wherein said blades have blade edges and working angles, said blade surfaces, blade edges and working angles being formed so that, with consideration of resistance taking place during loosening movement, required working powers for both teeth are substantially equal.

18. A loosening device as defined in claim 12, further comprising means for compensating movable masses which are not compensated by said drive means, and said compensating means including centrifugal weights.

19. A loosening device as defined in claim 18, wherein said drive means are provided with drive shafts and said centrifugal weights being arranged on said drive shafts.

20. A loosening device as defined in claim 12, wherein said teeth are formed as angular levers with said drive means including a joint eccentric and a driving rod connected with each of said angular levers.

21. A loosening device as defined in claim 12, wherein said teeth are pivotally mounted on said frame; and further comprising means for pivotally mounting said teeth and including flat springs being arranged so as to perform a path compensation in a horizontal direction.

22. A loosening device as defined in claim 12, wherein said teeth include a front tooth and a rear tooth, said flat spring of said front tooth being inclined downwardly rearwardly from a vertical line, the flat spring of said rear tooth being inclined downwardly forwardly relative to a vertical line.

23. A loosening device as defined in claim 12, wherein said frame is provided with holding means for direct supporting on a pulling vehicle.

24. A loosening device as defined in claim 12, wherein said blades are arranged on said teeth with substantially equal working angles.

25. A loosening device as defined in claim 12, wherein said blades include a front blade and a rear blade, said front blade being smaller than said rear blades.

26. A loosening device as defined in claim 12, wherein said blades include a front blade and a rear blade, the blade partial surface of said front blade having a rear edge located at the predetermined height, said rear blade having a blade tip which is located substantially at the height of said rear edge.

* * * * *